United States Patent
Akula et al.

(10) Patent No.: US 9,471,767 B2
(45) Date of Patent: Oct. 18, 2016

(54) CAPTCHA TECHNIQUES UTILIZING TRACEABLE IMAGES

(71) Applicant: Oracle International Corporation, Redwood Shores, CA (US)

(72) Inventors: Nagasravani Akula, Perala (IN); Rachit Raj, Bangalore (IN); Mohamad Raja Gani Mohamad Abdul, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/559,742

(22) Filed: Dec. 3, 2014

(65) Prior Publication Data
US 2016/0055329 A1 Feb. 25, 2016

Related U.S. Application Data

(60) Provisional application No. 62/040,695, filed on Aug. 22, 2014.

(51) Int. Cl.
*G06F 21/36* (2013.01)
*G09G 5/00* (2006.01)
(Continued)

(52) U.S. Cl.
CPC .............. *G06F 21/36* (2013.01); *G06K 9/6201* (2013.01); *G06T 11/203* (2013.01); *G09G 5/003* (2013.01); *G09G 2354/00* (2013.01); *G09G 2358/00* (2013.01); *G09G 2370/02* (2013.01)

(58) Field of Classification Search
CPC ...... G06F 21/36; G06F 3/0416; G06F 21/30; G06K 9/6201; G06T 11/203; G09G 5/003; G09G 2370/02
See application file for complete search history.

(56) References Cited

U.S. PATENT DOCUMENTS 7,721,107 B2 5/2010 Golle et al.
8,510,814 B2 8/2013 Pratte et al.
(Continued)

FOREIGN PATENT DOCUMENTS

CN 101702729 A 5/2010
EP 2330529 A2 6/2011
WO 2012/107879 A2 8/2012

OTHER PUBLICATIONS

M. Shirali-Shahreza et al. "Motion CAPTCHA" 2008 Conference on Human System Interactions, May 25-27, 2008 (pp. 1042-1044).*
(Continued)

*Primary Examiner* — Joseph P Hirl
*Assistant Examiner* — Thomas Gyorfi
(74) *Attorney, Agent, or Firm* — Kilpatrick Townsend and Stockton LLP

(57) ABSTRACT

Techniques are disclosed for generating, utilizing, and validating traceable image CAPTCHAs. In certain embodiments, a traceable image is displayed, and a trace of the image is analyzed to determine whether a user providing the trace is human. In certain embodiments, a computing device receives a request for an image, and in response, creates a traceable image based upon a plurality of image elements. The computing device transmits data representing the traceable image to cause a second computing device to display the traceable image via a touch-enabled display. The computing device receives a user trace input data generated responsive to a trace made at the second computing device, and determines whether the trace is within an error tolerance range of the set of coordinates associated with the traceable image. The computing device then sends a result of the determination.

21 Claims, 12 Drawing Sheets

(51) Int. Cl.
*G06F 3/041* (2006.01)
*G06T 11/20* (2006.01)
*G06K 9/62* (2006.01)

(56) References Cited

U.S. PATENT DOCUMENTS

| | | | |
|---|---|---|---|
| 2009/0138723 A1 | 5/2009 | Nyang et al. | |
| 2009/0187986 A1* | 7/2009 | Ozeki | G06F 21/33 726/21 |
| 2009/0297064 A1* | 12/2009 | Koziol | G06T 11/203 382/302 |
| 2010/0228804 A1 | 9/2010 | Dasgupta et al. | |
| 2011/0035584 A1* | 2/2011 | Meyerstein | H04W 8/265 713/155 |
| 2012/0222100 A1 | 8/2012 | Fisk et al. | |
| 2012/0246737 A1 | 9/2012 | Paxton et al. | |
| 2012/0254964 A1* | 10/2012 | Kumar | G06F 21/36 726/7 |
| 2012/0272302 A1 | 10/2012 | Zhu et al. | |
| 2012/0323700 A1 | 12/2012 | Aleksandrovich et al. | |
| 2013/0179958 A1* | 7/2013 | Fujiwara | G06F 21/36 726/7 |
| 2013/0225123 A1* | 8/2013 | Adjakple | G06Q 20/322 455/406 |
| 2013/0283378 A1* | 10/2013 | Costigan | G06F 21/55 726/23 |
| 2014/0047527 A1* | 2/2014 | Ngo | H04L 63/08 726/7 |
| 2014/0059663 A1* | 2/2014 | Rajshekar | H04L 63/08 726/6 |
| 2014/0289828 A1* | 9/2014 | Gross | A63F 13/12 726/6 |
| 2014/0366124 A1* | 12/2014 | Takehara | G06F 21/31 726/16 |
| 2015/0006886 A1* | 1/2015 | Mirashrafi | H04L 63/0823 713/156 |
| 2015/0007289 A1* | 1/2015 | Godse | G06F 21/31 726/7 |

OTHER PUBLICATIONS

Shah, N.A. and Banday, M.T.; "Drag and Drop Image CAPTCHA," *Sprouts: Working Papers on Information Systems*, vol. 8, No. 46 (2008), pp. 1-14, [retrieved on Feb. 20, 2014]. Retrieved from the Internet: <URL: http://sprouts.aisnet.org/8-46>, 16 pages.

"Confident Technologies Delivers Image-Based CAPTCHA to Increase Website Security and Improve User Experience," Press Release [online]. Confident Technologies, Inc., May 12, 2010, [retrieved on Jun. 3, 2014]. Retrieved from the Internet: <URL: http://confidenttech.com/news_events/confident-technologies-delivers-image-based-captcha-increase-website-security-and-improv>, 4 pages.

Crowcroft, J., "MotionCAPTCHA —Stop Spam, Draw Shapes," jesscrowcroft.com [online], 2013, [retrieved on Feb. 20, 2014]. Retrieved from the Internet: >URL: http://www.josscrowcroft.com/projects/motioncaptcha-jquery-plugin/>, 19 pages.

Takaya, M., et al., "Reverse Turing Test using Touchscreens and CAPTCHA," *Journal of Wireless Mobile Networks, Ubiquitous Computing, and Dependable Applications*, vol. 4, No. 3 (Sep. 2013), pp. 41-57, [retrieved on Feb. 20, 2014]. Retrieved from the Internet: <URL: http://isyou.info/jowua/papers/jowua-v4n3-3.pdf>.

Kumar, V. and Yadava, P.; "Position Based CAPTCHA: Changing Place Restriction Minimize the Automatic Access," *International Journal of Advanced Research in Computer Science and Software Engineering*, vol. 3, No. 10 (Oct. 2013), pp. 466-471.

"reCAPTCHA," Google.com [online], 2014, [retrieved on Feb. 20, 2014]. Retrieved from the Internet: <URL: http://www.google.com/recaptcha/learnmore>, 2 pages.

"reCAPTCHA," Google.com [online], 2014, [retrieved on Jun. 3, 2014]. Retrieved from the Internet: <URL: https://www.google.com/recaptcha/intro/index.html>, 5 pages.

* cited by examiner

TIME A
402

INDICATION OF
MODIFICATION =
1.0

TOUCH-ENABLED DISPLAY 108

PRESENTED
TRACEABLE
IMAGE
114

TIME B
404

INDICATION OF
MODIFICATION =
2.5

TOUCH-ENABLED DISPLAY 108

MODIFIED
TRACEABLE
IMAGE
410A

TIME C
406

INDICATION OF
MODIFICATION =
0.5

TOUCH-ENABLED DISPLAY 108

MODIFIED
TRACEABLE
IMAGE
410B

CAPTCHA TECHNIQUES UTILIZING TRACEABLE IMAGES

CROSS-REFERENCE TO RELATED APPLICATIONS

The present application is a non-provisional application of, and claims priority to U.S. Provisional App. No. 62/040,695, filed on Aug. 22, 2014, titled "IMPROVED CAPTCHA TECHNIQUES UTILIZING TRACEABLE IMAGES", the entire contents of which are herein incorporated by reference for all purposes.

FIELD

The present disclosure relates to the field of computing systems; and more specifically, to improved CAPTCHA techniques utilizing traceable images.

BACKGROUND

A CAPTCHA, which is an acronym for "Completely Automated Public Turing test to tell Computers and Humans Apart," is one type of challenge-response test used in computing to assist in determining whether or not a user is human or non-human. CAPTCHAs are typically thought of as automated tests that humans can pass with relatively little effort, but that most computer programs cannot pass, even with great effort.

The use of CAPTCHAs has become ubiquitous on the Internet in recent years as a security countermeasure against software programs that try to impersonate humans and interact with web applications designed for human use, often for malicious purposes. Examples of such programs include computers bots, programs responsible for distributed denial-of-service (DDoS) attacks, Web content "scraping" programs, and the like. While several different CAPTCHA schemes have been developed over the years, the software programs themselves have gotten smarter and as a result several existing CAPTCHA schemes have been "broken," i.e., automated programs have been crafted that can solve CAPTCHAs without human input, often through the use of machine learning, computer vision, and pattern recognition algorithms. This has led to something similar to a continual "arms race" between CAPTCHA developers that attempt to create more secure CAPTCHAs and the attackers that try to break them.

The development of a good CAPTCHA scheme is not easy, as a CAPTCHA must, by definition, be secure against automated attacks while simultaneously being human-friendly. Most CAPTCHAs in use today are text-based CAPTCHAs, in which distorted, noisy, or obfuscated text is displayed and a human has to identify the text and type it into an input box. To prevent such text-based CAPTCHAs from being "broken," developers have retreated to increasing the "noise" present in these CAPTCHAs to make it harder for the software programs to detect the embedded text. However, although increasing the noise makes it harder for the automated programs to break the CAPTCHA, it also makes it more difficult for a human to read and solve the CAPTCHA, leading inadvertently to increased human input errors.

BRIEF SUMMARY

The present disclosure relates generally to improved CAPTCHA techniques utilizing traceable images. Certain techniques are disclosed for presenting a traceable image to a user and analyzing a user trace of the image to determine whether the user is human.

In certain embodiments, the user traces the traceable image of a CAPTCHA using a touch-enabled display. In certain embodiments, the traceable image of the CAPTCHA may be output to a human user using a touch-enabled display of a computing device. The user may then solve the CAPTCHA by tracing the outline of the image. The computing device then generates data corresponding to the user trace input. The user trace input data is then validated against reference data stored for the CAPTCHA.

In some embodiments, based upon the user trace input, the user input device generates a set of coordinates representing the trace, and the coordinate information may be transmitted from the computing device to a traceable CAPTCHA engine (TCE) implemented at a server computing device for validation. The TCE then validates the user trace input data received from the computing device. In certain embodiments, the TCE may compare the received set of coordinates with a reference set of coordinates of that traceable image to determine whether the accuracy of the user trace is within an allowable error range. If the accuracy of the trace is with the allowable error range, then the user trace is considered validated and the user may be provided access to a resource protected by the CAPTCHA.

In certain embodiments, a web server of a server computing device receives a request for a CAPTCHA from a computing device. The request may be a request for an image or a request for a webpage. Responsive to this request, the TCE creates a traceable image based upon multiple image elements. The created traceable image is associated with a set of coordinates. The web server transmits data representing the traceable image to the computing device, causing the computing device to present the traceable image to the user via a touch-enabled display. The server computing device receives user trace input data corresponding to a trace of the presented traceable image made by the user via the touch-enabled display, and the TCE determines whether the trace of the presented traceable image is within an error tolerance range of the reference set of coordinates associated with the traceable image.

In certain embodiments, the server computing device determines which resource (of a plurality of resources) is to be transmitted to the computing device based upon the determination of whether the trace is within the tolerance range, and then transmits the selected resource to the computing device.

In certain embodiments, the TCE creates the traceable image by performing operations including selecting a plurality of image elements from a set of image elements, and combining the selected plurality of image elements to form the traceable image.

In certain embodiments, each of the set of image elements comprises a representation of a line or a curve.

In certain embodiments, the server computing device transmits, to the computing device, a set of code instructions associated with the traceable image. The set of code instructions, when executed by the computing device, cause the computing device to perform operations. The operations include, in response to a determination that the computing device has failed to receive a user trace input within a period of time after the traceable image was presented to the user, modifying the presented traceable image. The modifying may include changing a size (in one or more dimensions) of the traceable image, a location of the traceable image, and/or otherwise changing some or all of the traceable image via tilting, skewing, mirroring, pinching, cropping, color-modifying, etc. The modifying may include performing one modification technique, or may include using multiple modification techniques. The modifying may not require the computing device to transmit or receive any data using any network interface of the computing device.

In certain embodiments, the TCE determines whether the trace of the presented traceable image is within an error tolerance range based upon comparing a set of coordinates representing the trace (received as user trace input data) with a reference set of coordinates representing the traceable image. Each set of coordinates may be relative coordinates. In some embodiments, the comparing of the sets of coordinates includes generating a distance value indicating a distance between the trace and the traceable image. The distance value may be based upon point distance values, each indicating a distance between a point of the trace and a corresponding point of the traceable image. The point distance values may be Euclidean distances or Manhattan distances. The distance value may be a sum, mean, median, mode, standard deviation, or other mathematical or statistical metric, based upon the point distance values.

The foregoing, together with other features and embodiments will become more apparent upon referring to the following specification, claims, and accompanying drawings.

DETAILED DESCRIPTION

Figure 1:
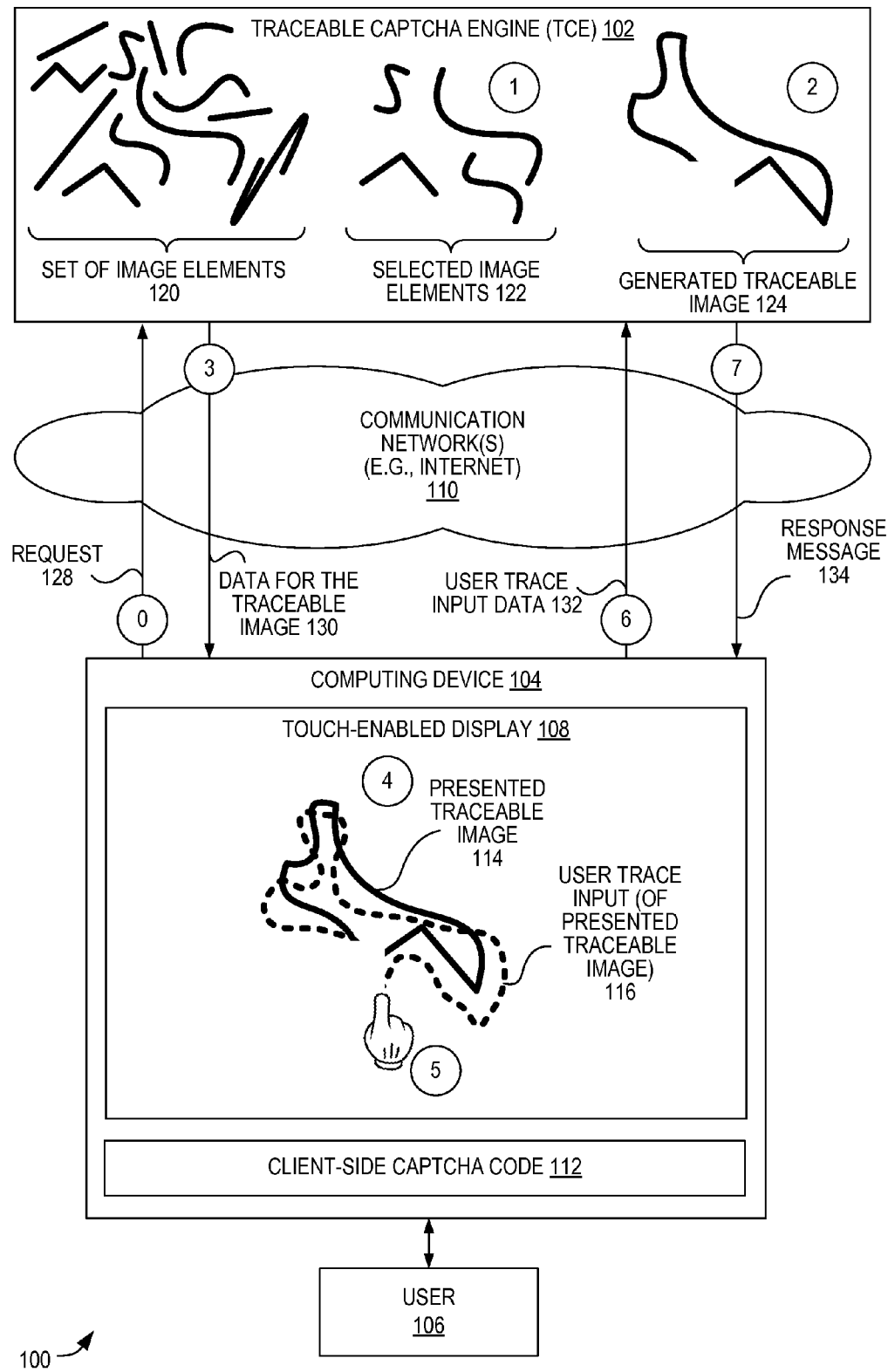
FIG. 1 illustrates a simplified high level block diagram and conceptual overview of an improved CAPTCHA technique utilizing traceable images according to some embodiments of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

The present disclosure relates generally to improved CAPTCHA techniques utilizing traceable images. Some embodiments include creating and presenting a traceable image representing the CAPTCHA. User trace input data is received indicative of a trace of the image, and the received trace input data is then validated against reference information stored for the traceable image. The validation may be deemed successful when the user trace input data matches and/or is within an error threshold of the stored reference information. Successful validation may indicate that the CAPTCHA has been successfully solved and that the trace input is deemed to have more likely than not been provided by a human user.

In some embodiments, to make the CAPTCHA even more tamper-proof, the traceable image itself may be modified if no trace input with respect to the displayed image is received within a certain time period after the traceable image has been output or displayed to the user. In some embodiments additional modifications to the CAPTCHA may occur after subsequent periods of time if no trace input is received relative to the currently-presented traceable image.

Different embodiments utilize different ways to generate the traceable CAPTCHA image. In some embodiments, a set of one or more traceable images may be pre-generated. Then, when a traceable CAPTCHA image is to be presented, one image is selected from this set of pre-generated images and presented to the user.

In some other embodiments, the traceable CAPTCHA image may be generated dynamically in response to a request for a CAPTCHA. For example, in some embodiments, a traceable CAPTCHA image is based upon and generated using a set of one or more image elements. The set of image elements may include simple shapes such as lines, curves, angles, or may include more complex shapes. Upon receiving a CAPTCHA image request, one or more image elements may be selected from this set of image elements, and the traceable CAPTCHA image is then generated based upon the selected image elements.

In some embodiments, reference information of the traceable CAPTCHA image is saved and used to validate received user trace input data representing a trace of the presented traceable CAPTCHA image. In some embodiments, the reference information comprises a set of relative coordinates, and in some embodiments the user input trace data is a set of relative coordinates. In some embodiments, a distance value is determined based upon the reference set of coordinates and the received set of user trace coordinates. In an embodiment, if the distance value is within an error tolerance range, the trace is validated, and if the distance value is not within the error tolerance range, the trace is not validated.

Accordingly, embodiments of the invention provide user-friendly CAPTCHAs. For example, many users utilize smart phones with small touch-enabled displays in which traditional CAPTCHAs cause difficulty—the presented letters are often very small, and it is challenging to easily "type" in the letters of the CAPTCHA using a virtual keyboard. Accordingly, embodiments of the invention enable users to provide a quick swipe of a finger to be validated as a human user. Moreover, embodiments of the invention are difficult for software "bots" to solve, as the traceable images can be dynamically generated to present a near-infinite supply of different traces, thus preventing the use of a stored database of solutions. Additionally, the traceable images may be easily modified during the time it takes a bot to perform analysis required to complete the challenge, such that a bot is never able to complete an analysis of a traceable image in time to be able to submit "trace data" for that particular image.

While certain embodiments are disclosed describing how traceable images can be used as part of an improved CAPTCHA system within webpages, this is not intended to be restrictive. In addition to webpages, the teachings disclosed herein can also be applied to other types of software-based applications and environments. Thus, the teachings are applicable to any application that may desire human authentication.

FIG. 1 illustrates a simplified high level block diagram and conceptual overview of an improved CAPTCHA system 100 utilizing traceable images according to some embodiments of the present invention. As illustrated, the improved CAPTCHA system 100 presents a network environment comprising a computing device 104 communicatively coupled via one or more communication networks 110 to a traceable CAPTCHA engine 102 ("TCE"). The embodiment depicted in FIG. 1 is merely one example and is not intended to unduly limit the claimed embodiments of the present invention. One of ordinary skill in the art would recognize many possible variations, alternatives, and modifications. For example, there may be more or fewer computing devices than shown in FIG. 1. Additionally, although in some embodiments the depicted interactions between the computing device 104 and the TCE 102 are direct (as illustrated), in other embodiments one or more (or all) of the depicted interactions may occur through another server (e.g., a web server), and thus the computing device 104 and the TCE 102 may or may not ever be in direct communication.

The computing device 104 may be of various different types including, but not limited to, personal computers (PCs), desktops, mobile or handheld devices such as a laptop, a mobile phone, a tablet, etc., and other types of devices. The communication networks 110 facilitate communications between the computing devices and the TCE 102. The one or more communication networks 110 can include networks of various types, each possibly including one or more networking devices or equipment including but not limited to network switches, routers, bridges, load balancers, etc. Examples of one or more communication networks 110 include, without restriction, the Internet, a wide area network (WAN), a local area network (LAN), an Ethernet network, a public or private network, a wired network, a wireless network, a virtual network, etc., and combinations thereof. Different communication protocols may be used to facilitate the communications through the one or more communication networks 110 including both wired and wireless protocols such as the IEEE (Institute of Electrical and Electronics Engineers) 802 suite of protocols, Internet Protocol (IP), TCP/IP (Transmission Control Protocol/Internet Protocol), Asynchronous Transport Mode (ATM), frame relay network protocols, Multi-Protocol Label Switching (MPLS), OpenFlow, IPX (Internetwork Packet Exchange), SAN (Storage Area Network) protocols, AppleTalk, Bluetooth, Long-Term Evolution (LTE), and other protocols. In general, communication networks 110 may include any communication network or infrastructure that facilitates communications between clients (e.g., computing devices) and the TCE 102.

A series of high-level operations are now described in FIG. 1 using the illustrated circles containing reference characters. In FIG. 1, the circles begin with circle 0 and end with circle 7, though in other figures numbers, letters, symbols, or other types of reference characters may be used. Additionally, the ordering of the reference characters do not imply a strict ordering required, and simply present one exemplary embodiment. Thus, in some embodiments, other orderings are used, and in some embodiments, not all of the operations represented by circles are used.

At circle 0, computing device 104 requests an image (or code for generating an image) by transmitting a request 128 for a resource. In certain embodiments, the request for a resource may result from the user 106 utilizing a program or application executed by the user's computing device 104. An example of such an application is a web browser, which may transmit requests for resources across communication networks 110 and display resources that are received in response to the requests. For example, in an embodiment the computing device 104 retrieves a webpage for a website provided by a web server, and the source code of the webpage identifies a resource provided by the TCE 102 (e.g., includes a URL of an image provided by the TCE 102). Thus, the request 128 may comprise, for example, an HTTP "GET" request for the image using the URL from the webpage.

Although example illustrated in FIG. 1 is presented in relation to browsers and webpages, in some embodiments improved CAPTCHA techniques utilizing traceable images may be utilized in other software applications such as in operating systems and/or special-purpose software including but not limited to social networking software, productivity software, file storage/sharing software, etc. Moreover, in some embodiments, the request 128 may be transmitted responsive to another event, such as the user 106 requesting access to another type of resource (e.g., a file or application) or another application or system event being generated (e.g., a timer expiring). Thus, the request 128 may also comprise other types of requests according to other protocols, including but not limited to FTP (File Transfer Protocol) or SFTP (SSH FTP) GET requests, rsync requests, rcp/scp requests, function calls, etc.

In some embodiments, the request 128 message is directed (e.g., forwarded, routed, etc.) through the one or more communication networks 110 and received by the traceable CAPTCHA engine (TCE) 102. Alternatively, in some embodiments the request 128 is instead received by a web server, which, in response to receipt of the request 128, sends a different request for the image to the TCE 102.

In response to receipt of the request 128, the TCE 102 identifies or generates a traceable image to be used within the improved CAPTCHA. In the exemplary embodiment of FIG. 1, the TCE 102 stores a set of image elements 120 (also referred to herein as "tiles") used to dynamically (i.e., in response to a particular request 128) generate a traceable image 124.

Accordingly, at circle 1 the TCE 102 selects one or more of the image elements 122 (from the set of image elements 120) to be used for generating a traceable CAPTCHA image 124. In one scenario, a single image element may be selected and serve as the generated traceable CAPTCHA image 124. In another scenario, multiple image elements may be selected and the final traceable CAPTCHA image 124 is generated based upon these multiple selected image elements 122.

At circle 2, the TCE 102 then combines the set of selected image elements 122 to form a generated traceable image 124. In some embodiments, this combination includes identifying end points of the selected image elements 122 (e.g., edge points where a depicted stroke exists at an edge of the image) and combining images based upon aligning their edge points. Further details regarding this process are described below with respect to other figures. Of course, the combination of the selected image elements 122 for the generation of the generated traceable image 124 may include manipulation/creation of image files and/or representations of images.

In some embodiments, the TCE 102 saves a copy of the generated traceable image 124 within a data store, and in some embodiments the TCE 102 saves a representative set of coordinates (relative, absolute, etc.) of the generated traceable image 124 that describes the stroke/pattern within the generated traceable image 124.

At circle 3, with the generated traceable image 124 ready, the TCE 102 transmits data for the traceable image 130 back through the communication network(s) 110 destined to the computing device 104. This data 130 may comprise an image file of the generated traceable image 124, multiple image files (e.g., each of the selected image elements 122), and/or representations of the generated traceable image 124 (e.g., JavaScript commands and/or sets of coordinate values). This data for the traceable image 130, in some embodiments, may also include client-side CAPTCHA code 112 used for presenting the traceable image and/or validating a user trace of the traceable image.

At circle 4, the computing device 104, having received the data for the traceable image 130 (e.g., from the TCE 102, from a web server, etc.) causes the generated traceable image 124 to be displayed to the user 106 as the presented traceable image 114. This may comprise a web browser of the computing device 104 rendering the presented traceable image 114 so that it is displayed on a display (e.g., an electronic visual display such as a computer or television monitor including but not limited to an LCD, LED, OLED, plasma, TFT, CRT, etc., a projection via a projector, etc.). In some embodiments, the display may be touch-enabled (e.g., touch-enabled display 108) and thus comprise an electronic visual display and/or sensing hardware (e.g., resistive or capacitive touch sensor, optical sensor) able to sense a user's 106 interaction with what is displayed. However, in some embodiments the display need not be touch-sensitive, and the user 106 may interact with the presented traceable image 114 using a mouse, keyboard, microphone, camera, or other form of user input device.

At circle 5, in some embodiments, the user 106 traces the presented traceable image 114 (e.g., moves a finger or pointing device over the depicted stroke(s) of the presented traceable image 114) to thus generate a user trace input of the presented traceable image 116. In some scenarios, the user 106 may provide the user trace input 116 in other ways, including but not limited to tracing the outline of the presented traceable image 114 using a mouse, issuing audio commands describing a trace of the presented traceable image 114 via a microphone, moving a body part (e.g., eye or head movement, hand/arm movement, etc.) to reflect a trace that can be detected may an input device such as a motion sensor, video camera, etc.

Thus, in some embodiments, the trace of the presented traceable image 114 made by the user 106 via the touch-enabled display 108 is detected by hardware of the computing device 104, which results in a user trace input being generated. In some embodiments, the user trace input comprises a "touch event" or a system event that may be detected by one or more of an operating system of the computing device 104, another application (e.g., a browser), and/or library/driver/etc. executed by the computing device 104. Techniques for detecting the user trace input are well known to those of skill in the art, and are not described herein in detail to avoid obscuring aspects of the invention.

As described above, in some embodiments the TCE 102 transmits client-side CAPTCHA code 112 to the computing device 104 before, with, or after it transmits the data for the traceable image 130. In some embodiments, the application utilizing the traceable image CAPTCHA may have been originally generated/installed with the client-side CAPTCHA code 112, or may have received the client-side CAPTCHA code 112 during a presentation of an earlier traceable image CAPTCHA.

Without regard to the various ways in which the client-side CAPTCHA code 112 arrives at the computing device 104, in some embodiments this client-side CAPTCHA code 112 is executed and receives the user trace input 116. For example, in some embodiments the client-side CAPTCHA code 112 comprises JavaScript code associated with a webpage that displays the traceable image CAPTCHA, and this JavaScript code registers one or more event listeners with the browser (e.g., executes an "addEventListener( )" method to listen for one or more events such as "touchstart", "touchmove", "touchend", "touchenter", "touchleave", "touchcancel", etc.). Upon the user's trace, one or more of the events are generated and information describing the trace is made available to the JavaScript code as the user trace input 116. Of course, many other techniques known to those of skill in the art may be used for an application to detect and receive the user trace input 116.

In some embodiments, the client-side CAPTCHA code determines a set of coordinates of the trace based upon the user trace input 116. The set of coordinates may be absolute coordinates or relative coordinates.

At circle 6, the user trace input data 132 is transmitted by the computing device 104 across the communication network(s) 110 and ultimately destined to the TCE 102 (though in some embodiments the user trace input data 132 flows through a web server before arriving at the TCE 102). The TCE 102, using either the previously stored copy of the generated traceable image 124, previously stored set of coordinates of the generated traceable image 124, or via a dynamic re-creation of the generated traceable image 124 (based upon an identifier of the generated traceable image 124 returned with the user trace input data 132 with the user trace input data 132, for example), the TCE 102 determines whether the received user trace input data 132 is valid.

In some embodiments, the validation by the TCE 102 to determine whether the received user trace input data 132 is valid includes determining whether it falls within an error tolerance range (i.e., whether the trace is a "close enough" trace that indicates the trace was likely made by a typical human) of the actual generated traceable image 124. In some embodiments, the TCE 102 makes this determination by determining distances between data points of the reference set of coordinates and a received set of coordinates of the user trace input data 132, and determining whether those distances, alone or in partial or complete combination, meet or exceed a configured allowable distance threshold value. In other embodiments, for example, when a defined percentage (e.g., 90%, 95%, 80%, etc.) of the trace coordinates (i.e., the user trace input data 132) are within a particular number of units (e.g., within 5 pixels, 1 centimeter, 0.5 inches, etc.) of the corresponding actual coordinate of the generated traceable image 124, the TCE 102 determines that the received user trace input data 132 is within the error tolerance range, and thus the user trace input data 132 is validated. Further detail regarding these determinations according to some embodiments is presented later with reference to other figures.

At circle 7, the TCE 102 may transmit a response message 134 that indicates a result of the determination of the validity of the trace. In some embodiments, the response message 134 is sent back to the computing device 104, and indicates whether the trace is valid or not. In some embodiments, this response message 134 may be sent back to a web server, which then, based upon the result of the validity determination, determines which resource to be transmitted back to the computing device 104. For example, in the event that the trace is deemed valid, the web server may select an earlier-requested resource to be sent to the computing device 104, including but not limited to a webpage, image, video, executable file, archive file (e.g., ZIP, tar, etc.), etc.

In some embodiments where the traceable image CAPTCHA is used within a web application, for example, the TCE 102 may be configured to, when the trace is not within the error tolerance range, generate and return a response message 134 (to the computing device 104 and/or to a web server) that causes another traceable image CAPTCHA to be presented to the user 106 to allow another opportunity to "pass" the CAPTCHA.

Figure 2:
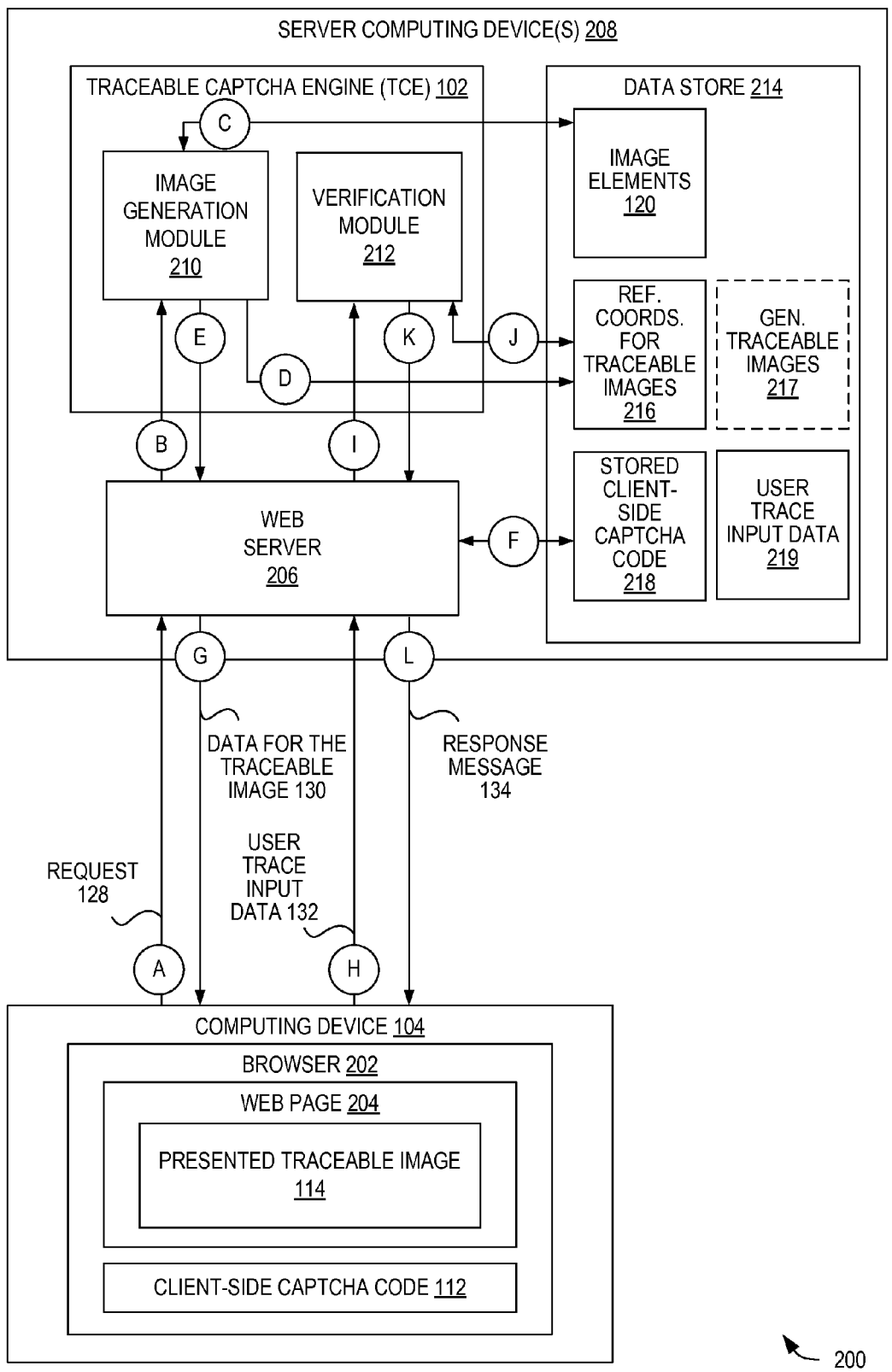
FIG. 2 illustrates a more detailed block diagram of a system including a traceable CAPTCHA engine according to some embodiments of the present invention.

Having thus described an overview of one embodiment, further aspects, details, and embodiments will be described in the subsequent figures. FIG. 2 illustrates a more detailed block diagram of a system 200 including a traceable CAPTCHA engine 102 according to some embodiments of the present invention.

It is to be understood that the TCE 102 illustrated in FIG. 2 is only one example of a system that may incorporate an embodiment of the invention. In some other embodiments, TCE 102 may have more or fewer components than shown in FIG. 2, may combine two or more components, or may have a different configuration or arrangement of components. For example, in some embodiments the TCE 102 includes the web server 206.

In various embodiments, TCE 102 can implemented using one or more computer systems (e.g., server computing devices 208) including, without limitation, a personal computer, a portable device (e.g., a mobile telephone or device), a workstation, a network computer, a mainframe, a kiosk, a server computer or cluster of server computers, or any other data processing system. In some other embodiments, traceable CAPTCHA engine 102 may be configured as a distributed system where one or more components of engine 102 are distributed across one or more networks and computing systems in the cloud. As a further example, a system utilizing the TCE 102 in some embodiments may not utilize a web server 206, but may simply instead configure the TCE 102 to receive requests and provide responses to clients (e.g., devices, software modules, etc.) using API calls, function/method calls, inter-process communication (IPC), etc. In other embodiments, the TCE 102 works with one or more web servers that are external and/or geographically remote to the server computing device 208.

In the depicted example system 200 of FIG. 2, the TCE 102 includes an image generation module 210 and a verification module 212. The TCE 102, image generation module 210, verification module 212, and/or web server 206 may be implemented in software (e.g., program code, instructions executable by a processor), in hardware, or combinations thereof. This depicted embodiment also illustrates a data store 214 storing a set of image elements 120, coordinates for generated traceable images 216, stored client-side CAPTCHA code 218, received user trace input data 219, and generated traceable images 217. In some embodiments, the software and/or data store 214 may be stored in memory (e.g., a non-transitory computer-readable medium), on a memory device, or some other physical memory and may be executed by one or more processing units (e.g., one or more processors, one or more processor cores, one or more GPUs, a combination thereof, etc.).

In this example system 200, the computing device 104 is illustrated as executing a web browser 202 that renders/presents a web page 204 including the presented traceable image 114 and executes client-side CAPTCHA code 112. Examples of browsers include, without restriction, various versions of Internet Explorer (IE) by Microsoft™, Safari by Apple™, Chrome by Google™, Firefox by Mozilla™, Opera by Opera Software ASA, and others.

A series of operations occurring between the elements of the system 200 of FIG. 2 is presented using circles encapsulating letters of the alphabet from A to L, although this does not imply a strict ordering is necessary.

At circle A, the computing device 104 transmits the request 128 to the TCE 102 executing at the server computing devices 208. This request 128 may be transmitted responsive to a user interacting with a webpage 204 displayed by a browser 202 via a display, and may comprise an HTTP GET message. In some embodiments, the request 128 is generated by the browser 202 responsive to the browser 202 earlier receiving the webpage 204 (from the web server 206 or from a different source, such as a third part web server utilizing a service provided by the TCE 102) that includes a reference to an image (e.g., an <IMG> element within the source code of the webpage 204). Thus, the request 128 may comprise an HTTP GET message seeking the identified image resource, which the browser 202 seeks in order to render the webpage 204.

In some embodiments, the request 128 is received by the web server 206, which determines that the request 128 is for a traceable image for an improved CAPTCHA, and issues a request, at circle B, to the image generation module 210 of the TCE 102 for a traceable image. In some embodiments, the issued request comprises some or all of the request 128 received from the computing device 104, but in some embodiments it is an API call, function call, etc.

Various different ways may be used to generate the traceable CAPTCHA image. In some embodiments, a set of one or more traceable images may be pre-generated. Then, when a traceable CAPTCHA image is to be presented, one image is selected from this set of pre-generated images and presented to the user. In some other embodiments, the traceable CAPTCHA image may be generated dynamically in response to a request for a CAPTCHA. For example, the traceable CAPTCHA image may be generated responsive to a request for a CAPTCHA or responsive to a request for a resource that is protected using a CAPTCHA (e.g., a request for a webpage that includes a reference to a CAPTCHA).

As illustrated in FIG. 2, upon receipt of the request, the image generation module 210, at circle C, selects one or more of the set of image elements 120 of the data store 214, and combines the selected images to form a generated traceable image.

In some embodiments, each of the set of image elements 120 may be an image file (e.g., a PNG, JPG, GIF, TIFF, RAW, BMP, or any other type of raster, vector, stereo, or compound image file) or a representation of an image such as descriptions of elements within the images or instructions for generating the image. The set of image elements 120 may be stored as individual files, grouped into one or more files, stored within database records, etc.

In some embodiments, each of the set of image elements 120 has a traceable image portion. For example, in some embodiments each image element of the set of image elements 120 includes a representation of a single stroke—straight, curvilinear, angled, or otherwise—that can be traced with one continuous stroke of a finger, pointing device, mouse, etc. However, in some embodiments some of the set of image elements may include multiple strokes, shapes, designs, patterns, and/or noise.

The selection of particular image elements 120 to be included within the set of selected image elements 122 may occur according to a randomized algorithm (e.g., with or without replacement) that uses a degree of randomness (or semi- or pseudo-randomness, such as values generated by a pseudorandom number generator). In one embodiment, the TCE 102 generates a unique random seed value (e.g., a master key), and based upon the value of this seed value, one or more of the set of image elements 120 are identified and thus selected.

However, in some embodiments, the TCE 102 generates a traceable image by selecting an image from a cache of pre-generated traceable images 217. This selection may be random, pseudo-random, or algorithmic (e.g., sequential, sequential using a step function, etc.).

During or after the generation of the traceable image, the image generation module 210 may generate/identify a set of coordinates for the generated traceable image 216 and store, at circle D, these coordinates in data store 214. In some embodiments, these stored coordinates 216 are indexed according to a unique identifier, which may be based upon a randomly generated number, an output of a function using the generated traceable image as an input (e.g., a hash function, cryptographic function, etc.), a date and/or time, a session identifier of the session state stored by the web server 206 to identify the browser 202 session, and/or a number associated with the received request 128, computing device 104, browser 202, or webpage 204.

At circle E, the generated traceable image (and optionally the unique identifier associated with the generated traceable image) is returned to the web server 206, which, in some embodiments, retrieves stored client-side CAPTCHA code 218 from data store 208 at circle F. This client-side CAPTCHA code 218, in an embodiment, comprises script code (e.g., JavaScript code) associated with the traceable image CAPTCHA that may control the display of the generated traceable image, any transformations of user trace input 116 received as a result of a user trace, any modifications to be made to the image, and/or the transmission of the user trace input data 132 back to the TCE 102.

In some embodiments, circle F occurs before circle A. For example, the request 128 may be made after the browser has already requested (and received) a webpage to include the traceable CAPTCHA, which may include the client-side CAPTCHA code 112 or include a reference to the stored client-side CAPTCHA code such that the computing device 104 also transmits a separate request for it.

At circle G, the web server 206 returns the data for the traceable image 130 (e.g., the image file or a set of instructions for generating the image). This data, in some embodiments, further includes the unique identifier of the generated traceable image and/or the stored client-side CAPTCHA code 218.

The computing device 104, with the received traceable image, displays it as the presented traceable image 114.

In certain embodiments, a user interacts with the CAPTCHA by directly tracing over a presented traceable image. In some embodiments, the traceable image representing the CAPTCHA may be presented via a touch-enabled display such as a display of a computing device such as a cellular phone or tablet. In such embodiments, a user may use a finger, stylus, or other contact element, for example to trace over the outline of the traceable image. In some embodiments, the image may be presented using a non-touch enabled display. In such embodiment, the traceable image may be "traced" over using an input device such as a mouse (or other input device such as a keypad) by manipulating a tracing element, such as a cursor, over an outline of the traceable image.

In some embodiments, since the input for the traceable image is provided by tracing the outline of the image, there is no need for a separate text input box (e.g., for entering alphanumeric characters) for the CAPTCHA as required for text-based CAPTCHAs. In some embodiments, there may even be no need for a "Submit" button to confirm completion of the CAPTCHA input as the completion of a trace may be detected by the computing device based on trace input. In other embodiments, a "Submit" button may be provided, which when selected, indicates that the entry of trace input has been completed.

A traceable image CAPTCHA may be presented and used in various different contexts. For example, in one use case, the traceable image may be provided on a web page displayed by a web browser. For example, in response to a web page or Uniform Resource Locator (URL) requested by a user via a browser, a web page may be presented to the user comprising the traceable image. This may, for example, be presented to the user when the user is trying to log into an account or trying to access a resource. The user URL request may be communicated from the user device to a server, which responds by sending a web page comprising the traceable image. In one embodiment, the web page may be encoded in HTML, or its variants, and may include data for the traceable image (e.g., code for generating the image) or a link to the traceable image, which is then fetched as part of the web page rendering process.

In another use case, the traceable image CAPTCHA may be presented by a non-browser application. For example, the CAPTCHA may be presented to a user when the user attempts to access a resource that is protected by the CAPTCHA.

The computing device 104 may then receive user trace input representing a user trace of the image. As described elsewhere, the client-side CAPTCHA code 112 may then assemble data describing the trace to create a user trace input data 132 (e.g., assemble raw trace data, transform trace data into a set of absolute or relative coordinates, etc.), and cause it to be sent, at circle H, to the web server 206. This transmitted user trace input data 132 may, in some embodiments, include the unique identifier of the generated traceable image. In some embodiments, the user trace input data 132 may comprise an HTTP POST request message.

In various embodiments, the client-side CAPTCHA code 112 may transform the user trace input 116 to generate user trace input data 132 in various ways. For example, the client-side CAPTCHA code 112 may acquire the user trace input 116, which may include one or more of coordinates of the beginning, middle portions, or end of the user's trace with respect to the user's screen or a presented viewport, window, or touch-sensitive area of a user interface. In an embodiment, the client-side CAPTCHA code 112, based upon the user trace input 116, determines a set of coordinates of the trace. In some embodiments, the set of coordinates may be relative coordinates and represent multiple coordinates of the trace, where the position/location of each of the multiple coordinates relates to the location of another coordinate. For example, a set of coordinates for a trace may all have positions described with respect to a first detected point of the trace. As another example, a set of coordinates for a trace may all have positions described with respect to previous point of the trace. In other embodiments, however, other representations of user trace input may be used that serve to describe the trace, such as one or more points/coordinates of the trace.

Upon receipt of the user trace input data 132—which may include a set of coordinates—the web server 206 may forward, at circle I, the user trace input data 132 to a verification module 212 for the user trace to be verified. In some embodiments, the verification module 212 retrieves the stored reference set of coordinates 216 for that generated traceable image, which may occur using a unique identifier of the generated traceable image returned with (or within) the user trace input data 132. The verification module 212, by comparing the received user trace input data (e.g., a set of relative coordinates corresponding to the trace, as generated by the client-side CAPTCHA code 112) with the retrieved stored set of coordinates, is able to determine whether the user trace of the presented traceable image constitutes a human-generated trace. In some embodiments, this determination includes determining whether the received user trace input data falls within an error tolerance range of the set of coordinates associated with the traceable image.

In some embodiments, the verification module 212 instead retrieves the stored generated traceable image 217 from data store 214, and determinates the validity of the trace by generating reference coordinates based upon the retrieved stored image 217 and comparing those reference coordinates to coordinates of the user trace input data 132.

Based upon the validity determination, the verification module 212 may return a result to the web server 206 at circle K. In some embodiments, the verification module 212 returns a Boolean-type response (e.g., a Yes/No or True/False or 0/1) value to indicate whether the trace is a valid human trace, but in some embodiments the verification module 212 identifies what resource should be returned to the computing device 104 based upon the result of the determination. For example, in some embodiments, when the determination indicates that the trace is valid (i.e., the received user trace input data does fall within the error tolerance range), the verification module 212 identifies a resource that the computing device 104 is to be sent, which may be defined according to configuration or based upon one or more previous messages sent by the computing device 104 seeking a particular resource that is "protected" by the traceable image CAPTCHA. As another example, in some embodiments, when the determination indicates that the trace is not valid, the verification module 212 may instruct the web server 206 to return a newly-generated traceable image for another CAPTCHA, which may trigger the web server 206 to return as the response message 134 (at circle L) another webpage identifying a new traceable image (and thus lead to another request 128), or may trigger the web server 206 to proactively request the generation of a new traceable image CAPTCHA (e.g., at circle B) from the image generation module 210, and return the new traceable image CAPTCHA as part of response message 134 at circle L.

In some embodiments, the TCE 102 may execute within the same computing device 104 that provides the presented traceable image 114. In some these embodiments, the messaging associated with circles A, G, H, and L may be sent from the browser 202 (or another application) to the TCE 102 within the computing device 104 using techniques known to those of skill in the art, including but not limited to function calls, inter-process communication techniques such as message passing, synchronization, shared memory, and remote procedure calls (RPC), etc. In some embodiments, some or all of the TCE 102 may be included with an application (e.g., browser 202) as a Software Development Kit (SDK).

Figure 3:
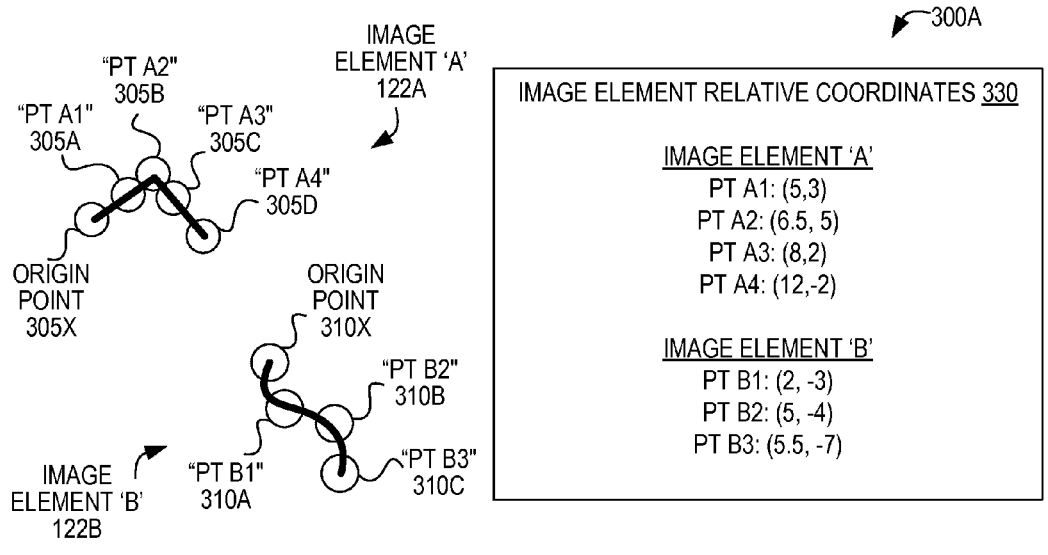
FIG. 3 illustrates the generation of a traceable image and an associated reference set of image coordinates based upon selected image elements according to some embodiments of the present invention.
Figure 3:
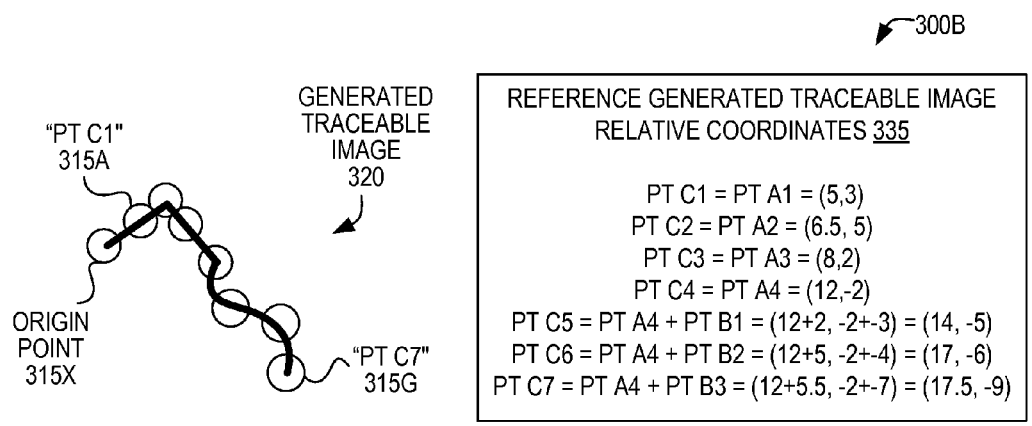
Figure 3:
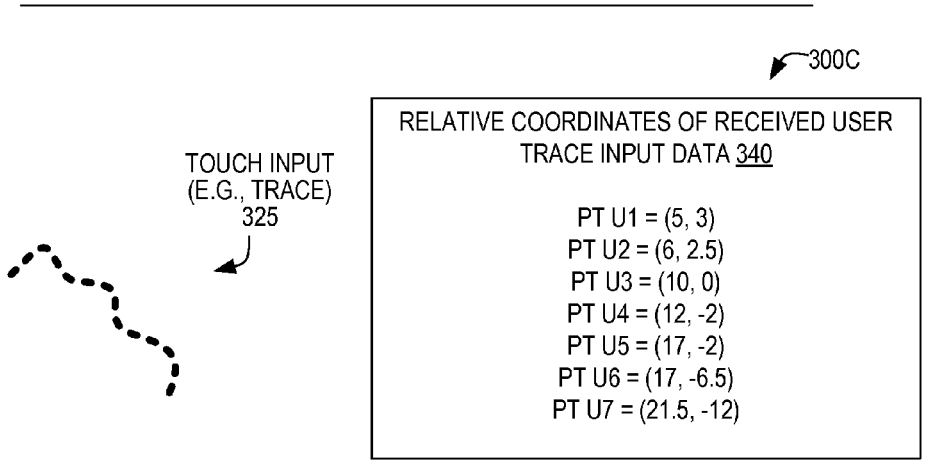

Having detailed certain exemplary systems utilizing improved CAPTCHA techniques utilizing traceable images, additional detail regarding traceable image generation is now presented with respect to FIG. 3. FIG. 3 illustrates the generation of a traceable image 320 and an associated reference set of image coordinates 335 based upon selected image elements 120A-120B according to embodiments of the present invention. In some embodiments, aspects and/or operations described with respect to FIG. 3 may be performed by an image generation module 210 of a TCE 102 as depicted in FIG. 2.

Turning back to FIG. 3, a traceable image CAPTCHA may be constructed using image elements from a set of image elements 120. These image elements 120, to be considered traceable, may be generated manually (e.g., by humans) or programmatically (i.e., by automated or semi-automated software) according to a set of rules. For example, the set of rules may be constructed to require generating a particular image element size/shape/color (e.g., a square, a rectangle, etc. of particular dimensions), and/or that generated images must have strokes with a particular width, and/or that a stroke may not cross or touch itself, and/or that a stroke must be of at least a particular length, and/or that a stroke must have two edge points (where the stroke touches a border of the image), and/or that a stroke must have an origin point touching one particular edge and an exit point touching a same or different edge, and many countless variations that may be flexibly designed according to the desire of the implementer. The amount of image elements that may be generated and utilized in the set of image elements 120 may be near infinite, and may be constrained by the needs of storage space, processing power, amount of different sub-combinations that can be generated, etc.

According to some embodiments, the set of image elements includes images that are "tiles" (e.g., rectangles, squares, etc.) that can be easily combined. In some embodiments, each of the tiles includes a representation of a single stroke—straight, curvilinear, angled, or otherwise—that can be traced with one stroke. In some embodiments, each of the tiles has only two locations (referred to herein as "border points") lying on its perimeter (i.e., border) that the single stroke touches, which can be thought of as an entry point and an exit point for the tile. In some embodiments, the selected one or more image elements (i.e., tiles) are identified and combined by placing the image elements such that each border point touches a border point of an adjacent tile.

Additionally, the tiles need not only contain a single stroke, but may include multiple strokes and/or other "noise" data meant to obscure the relevant stroke data from non-human users.

With a set of image elements 120, the image generation module 210 may be configured to generate traceable images based upon a defined number of selected image elements, or dynamically select a different number of selected image elements. For example, the image generation module 210 may be configured to generate traceable images based upon exactly one, two, three, four, five, etc., image elements, or may be configured to select a random number of images (e.g., a random number of image elements between 2 and 5, etc.).

In the depicted example of FIG. 3, a generated traceable image 320 will be constructed based upon two selected image elements 122—an image element 'A' 122A, and an image element 'B' 122B. Each image is depicted only as having a single stroke, and thus no background or borders (aside from the borders of the stroke itself), which is for the sake of clarity of description and understanding. Thus, in some embodiments these image elements are within a larger image including a background (and optionally other features such as colors, shapes, patterns, etc.), but in some embodiments the image elements may only include the trace data illustrated here.

In some embodiments, each image element 122A-122B includes a set of points, which may be identified and stored at the time the image element was generated or introduced into the set of image elements 120, or may be dynamically identified when the generated traceable image 320 is being constructed. In some embodiments, the end points of each image element 122A-122B are identified, and the image elements 122A-122B may be rotated and/or moved such that one end point of each image is combined (e.g., point A4 305D of image element A 122A is combined with the origin point 310X of image element B 122B). This process may be repeated for all selected image elements to generate the traceable image 320, either step-by-step or all at once. In some embodiments, the combination of the image elements may also adhere to a set of rules, such as a rule indicating that, when two image elements are being combined, they may only intersect at precisely the one point—which ensures that the ultimately constructed image is a traceable one. If a proposed image combination results in a rule failure, one of the image elements may be rotated or otherwise modified (e.g., enlarged or shrunk in one or two dimensions) and a new proposed image combination is formed and the set of rules are again examined.

In some embodiments, a set of points for each image element 122A-122B is identified, and the number of points per image element may roughly coincide to a number of pixels in the image element, or may be a much reduced number of points selected according to some metric. For example, each image element may have a particular number of approximately evenly-spaced points identified, a particular number of points per unit length of the stroke, etc. In the depicted embodiment, image element A 122A has five points identified—an origin point 305X, point A1 305A, point A2 305B, point A3 305C, and point A4 305D (which may be deemed an ending point). Similarly, image element B 122B also has five points identified—an origin point 310X, point B1 310A, point B2 310B, point B3 310C, and point B4 310D (which may also be deemed an ending point).

With the set of identified points, the image generation module 210 (or another component of TCE 102) may generate a set of image element relative coordinates 330, which is displayed at 300A. In the depicted example, the coordinates 330 are relative to the origin point in each image element. Thus, the coordinates 330 for image element A 122A include four relative coordinates. The first is: (5, 3) for point A1 305A, which indicates that point A1 305A (on a Cartesian system, perhaps) is 5 units to the right (because it is a positive value) of the origin point 305X and 3 units above (because it is a positive value) of the origin point 305X. Similarly, the last coordinate (for point A4 305D) is: (12, −2), which indicates that point A4 305D is 12 units to the right of the origin point 305X and 2 units below (because it is a negative value) the origin point 305X. In this embodiment, the coordinates 330 for image element B 122B include only three relative coordinates. For example, the last coordinate (for point B3 310C) is: (5.5, −7), which indicates that point B3 310C is 5.5 units to the right of the origin point 310X and 7 units below the origin point 310X.

Turning to 300B, upon generating the generated traceable image 320 as described above, the image generation module 210 may, based upon the set of image element relative coordinates 330, form a set of generated traceable image coordinates 335. This "reference" set of generated traceable image coordinates 335 may indicate positions relative to the origin point 315X from the first image element A 122A, and may be formed by using the relative coordinates of points A1-A4 305A-305D (of coordinates 330) and then adding the coordinate values of points B1-B3 310A-310C to the coordinates of point A4 305D (which is the point where image element A 122A and image element B 122B were joined). The reference set of generated traceable image relative coordinates 335 may be stored, for example, as part of the coordinates for generated traceable images 216 of FIG. 2, and may be indexed according to (e.g., stored along with, or stored in a particular memory location based upon) a unique identifier of the generated image.

Moving forward in time, after the generated traceable image 320 is presented to the user, the TCE 102 receives a user trace input data 132 (i.e., trace data) from the computing device 104. This user trace input data 132 may be transmitted by the computing device 104 responsive to the user 106 simply tracing the trace of the presented traceable image 116 (e.g., the trace 116 may be detected by client-side CAPTCHA code 218, which causes the user trace input data 132 to be transmitted), or may be transmitted by the computing device 104 after the user 106 traces and then purposefully "submits" the trace (e.g., selects a "submit" button). Regardless, the trace 116 is illustrated in FIG. 3 as trace input 325 for ease of understanding; of course, in some embodiments, an actual image representing the trace is not provided as part of the user trace input data 132.

In some embodiments, the representation 132 includes raw trace data that is transformed into a set of coordinates 340 by the verification module 212 (or another component of the TCE 102), but in some embodiments the transformation has already occurred at the computing device 104 by the client-side CAPTCHA code 218. The transformation may occur by identifying a set of points according to the same scheme used above for identifying points (as described with respect to section 300A) of candidate image elements, and thus the points should roughly correspond to the identified points of the generated traceable image 320. For example, points may be identified from the trace input 325 at a particular spaced intervals, or a particular number of points may be identified that are evenly-spaced, etc. The depicted example indicates that the coordinates 340 of the trace (based upon, or received within, the received user trace input data) include seven coordinates (i.e., Point U1 through Point U7) that correspond to the seven coordinates of the previously-generated traceable image relative coordinates 335.

The verification module 212 of the TCE 102, based upon configuration, may determine whether the trace input 325 is valid in numerous ways.

For example, in some embodiments the verification module 212 generates a distance metric indicating a total distance between the trace input 325 and the generated traceable image 320, and will determine that the trace is valid if the total distance is within an error tolerance range (e.g., the total distance is less than a defined error tolerance value). In some embodiments, a total distance is derived by determining a point distance between each corresponding point in the trace coordinates 340 and the set of coordinates 335 of the generated traceable image 320, and basing the total distance upon each individual point distance (e.g., calculating a sum of the individual point distances).

For example, in the depiction of FIG. 3, a point distance for a first point is calculated as a distance between Point U1 (of trace coordinates 340) and Point C1 (of generated image coordinates 335). The distance may be any distance metric that differentiates between different distances, and may include generating Euclidean distances (e.g., distance ((x, y), (a, b))=$\sqrt{((x-a)^2+(y-b)^2)}$) between the coordinates, Manhattan distances between coordinates, Minkowski distances between coordinates, etc. In this case, as the coordinates for Points U1 and C1 are both (5, 3), the Euclidean distance (and thus the Point 1 point distance) is zero. However, the point distance between Point U2 and Point C2, using a Euclidean distance formulation, is approximately 2.55. In some embodiments, each of the seven point distances is computed (e.g., dist_1=0, dist_2=2.55, dist_3=2.83, dist_4=0, dist_5=4.24, dist_6=0.5, and dist_7=5), and a total distance may be computed, in some embodiments, as a sum of all the point distances (e.g., total_distance=0+2.55+2.83+0+4.24+ 0.5+5=15.12). Then, this total distance value may be compared to a defined error tolerance value. In a configuration where the error tolerance value is set as 20, the distance of 15.12 does not meet or exceed the value, and thus the trace is valid. In a configuration where the error tolerance value is set as 10, the distance of 15.12 does meet or exceed the value, and thus the trace is deemed invalid.

Of course, in other embodiments many different parameters and/or calculations for determining a validity of a trace (e.g., whether a trace falls within a defined error tolerance range) may be used. For example, as discussed above, individual point distances may be calculated using different distance functions other than Euclidean distances. Additionally, instead of summing all of the point distances to find a total distance, many other techniques may be used, including but not limited to calculating a mean, median or mode of the point distances, etc. Another parameter used in the validation may include a time required to complete the trace. Yet another parameter may include the chosen beginning and/or ending points of the user's trace.

As an additional example, in some embodiments, the verification module 212 of the TCE 102 determines whether the trace input 325 is valid by utilizing a validity rule indicating that no corresponding points may differ by more than a particular distance. In the above example using Euclidean distance measures, a maximal acceptable point distance value may be configured, and if any of the individual point distances meet or exceed that value, then the trace is invalid. For example, if a maximal acceptable point distance value is set as 5, then the trace 325 would be found invalid, as at least one point distance (i.e., distance between Point U7 and Point C7, which is five) meets or exceeds the maximal acceptable point distance value. Additionally, a validity rule may indicate that only when a defined number of the points (e.g., 2, 5, 20) deviates from the maximal acceptable point distance value is the trace deemed invalid. For example, a validity rule may be configured to state that only two points may have a point distance greater than "4" (the above example would thus be valid, as only dist_5 and dist_7 exceed the value four). Similarly, a validity rule may indicate that a particular percentage of the points must have a point distance smaller than an allowable error value. For example, a validity rule may be configured to indicate that 90% of the point values must be less than or equal to 5 for the trace to be deemed valid. Of course, many other ways would be recognized by those of skill in the art for determining whether a provided trace input 325 for a trace falls within a particular "closeness" range of a generated traceable image, and thus these example configurations are not exhaustive but instead illustrative.

In some embodiments, the presented traceable image 114 may be modified after it is initially presented to the user. In some embodiments, this technique significantly increases the difficulty for automated non-human applications to solve the improved CAPTCHA techniques presented herein due to the changing nature of the problem to be solved.

Thus, in some embodiments, to make the CAPTCHA even more tamper-proof, the traceable image itself may be modified if no trace input with respect to the displayed image is received within a certain time period after the traceable image has been displayed to the user. In some embodiments, the modification may be performed solely by the user device, and in other embodiments the modification may include the user computing device receiving additional data (e.g., another traceable image, an indication of a modification to be made, etc.) from the TCE. In some embodiments additional modifications to the CAPTCHA may occur after subsequent periods of time if no trace input is received relative to a currently-presented traceable image.

For example, the CAPTCHA may be configured to modify the displayed traceable image one or more times until a timeout occurs. A timeout value may be set as a maximum number of modifications allowed to be done before the CAPTCHA is deemed invalid, or a total amount of time allowed for completion (i.e., receipt of a trace) of the CAPTCHA before the CAPTCHA is deemed invalid. In some embodiments, each of the modifications may occur after a set interval of time (e.g., every 10 seconds the image is modified) or after potentially differing intervals of time (e.g., after 30 seconds the image is modified, and then after an additional 25 seconds the image is modified again, and then after an additional 20 seconds the image is modified again, etc.).

In some embodiments, the time intervals are configured as consecutive time periods where absolutely no trace data is provided. For example, in an embodiment, after 10 seconds with absolutely no trace input data being provided, the image is modified. In some embodiments the time intervals are configured an amount of time in which a mostly complete trace is not provided. For example, in an embodiment, if after 10 seconds less than thirty percent of a "full" trace has been completed the image is modified. In some embodiments, this threshold value (i.e., "after 10 seconds") may be flexibly configured to allow for more or less time to provide the trace.

The traceable image 114 may be modified using one or more different techniques. According to one technique, the modification includes preserving the same image but changing a location of the presented image. According to another technique, the size of the traceable image is modified or "scaled" (e.g., using shrinking or enlarging) in one or more dimensions. According to yet another technique, the color of some or all of the presented image may be changed or additional noise may be introduced into the traceable image. In other embodiments, combinations of various techniques may be used to modify the traceable CAPTCHA image. Other image modification techniques include tilting or skewing some or all of the image, mirroring some or all of the image, pinching some or all of the image, cropping some of the image, etc. Of course, a modification may include the use of one modification technique or a combination of multiple image modification techniques.

In some embodiments, the client-side CAPTCHA code, when submitting user trace input data (e.g., a set of coordinates of a trace), may also transmit an indicator describing what modifications, if any, were performed to the presented traceable image. In some embodiments, however, the client-side CAPTCHA code is configured to, based upon its knowledge of the modifications, translate the received user input back into an original frame of reference corresponding with the original traceable image. For example, if a modification included magnifying the traceable image by a factor of two, a received trace of the magnified image may be converted by the client-side CAPTCHA code back to the original scale (e.g., by scaling the set of coordinates back based upon the scaling factor).

In some embodiments where the traceable image is or may be modified, the TCE may receive an indication of the modification(s) made to the traceable image that was actually traced. The TCE may then scale or otherwise transform the received representation of the trace accordingly when determining if the trace was within the error tolerance range.

As described herein, in some embodiments a modification to the image may be performed locally (i.e., by the user device), but in some embodiments a modification to the image may be performed by the TCE, and thus a "new" modified image will be transmitted from the TCE to the user device. This configuration may provide enhanced security compared to embodiments utilizing client-side modifications, as enhanced CAPTCHA-defeating programs/scripts/bots could potentially be implemented to detect and defeat client-side modification schemes. For example, in some embodiments using client-side modifications, a bot could potentially thus be afforded additional time to "crack" the original CAPTCHA, and then send the co-ordinates for the original image to the TCE without any additional information, and/or detect a modification and transform the "cracked" original co-ordinates into the "correct" modified coordinates. However, this configuration could lead to increased network traffic (as additional image data would be transmitted between the TCE and user device) and potentially increased processing load on the TCE (for generating additional, modified images). Thus, the selection of which modification configuration is flexibly left to the demands of the particular operational environment, security needs, and preferences of the implementing party.

Figure 4:
FIG. 4 illustrates the modification of a traceable image according to some embodiments of the present invention.
Figure 4:
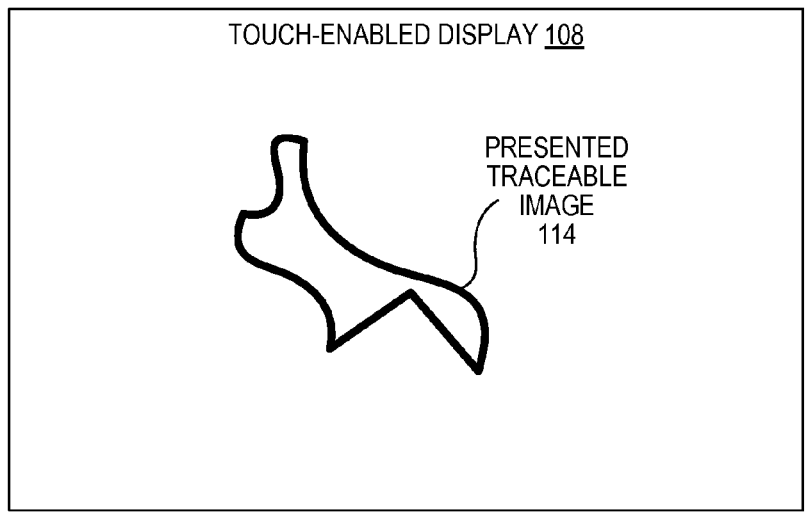
Figure 4:
Figure 4:
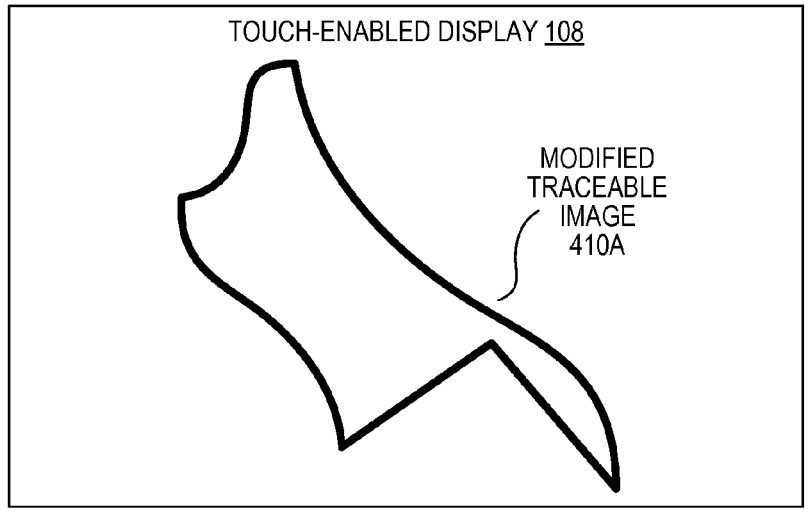
Figure 4:
Figure 4:
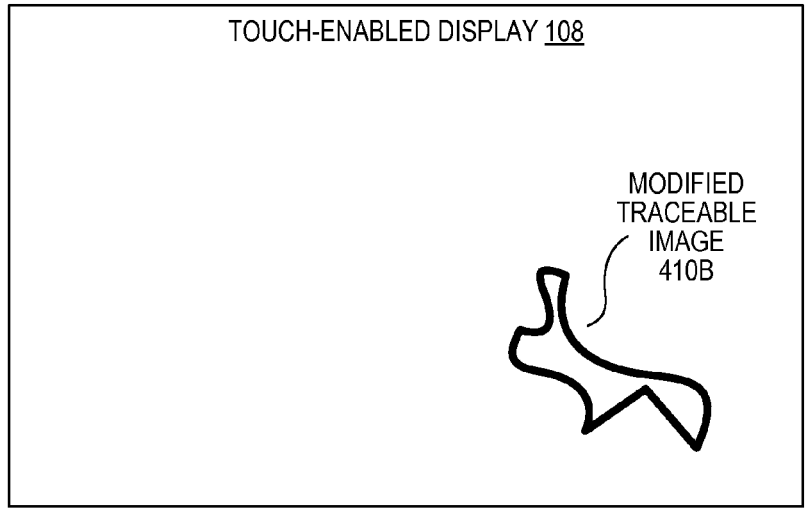

To this end, FIG. 4 illustrates the modification of a traceable image according to some embodiments of the present invention.

At time indicator A 402, a touch-enabled display is illustrated with a first presented traceable image 114 being displayed to a user. This time indicator A 402 corresponds to an initial point in time (e.g., time=1), though it need not be the initial moment the presented traceable image 114 is displayed or even one second or unit of time after. Instead this time value simply indicates one point in time that is different than the later presented time indicator B 404 and time indicator C 406.

At time indicator A 402, the presented traceable image 114 is displayed to the user 106 in its original form. In this illustration, an indication of modification value of "1.0" is associated with the presented traceable image 114, and this value may be ultimately included with (or within) the user trace input data 132 transmitted by the computing device 104 to the TCE 102 at the completion of the user 106 trace. In this example, the indication of modification value indicates a scaling factor of the presented image, and thus, the value 1.0 indicates that the traceable image 114 was not scaled (e.g., as any X value multiplied by 1.0 is still X).

At some other time indicator B 404, the presented traceable image 114 is modified by scaling it according to an indication of modification value of "2.5" and thus the modified traceable image 410A is presented as an image that is two-and-a-half times larger than the original presented traceable image 114 (here in two dimensions, but this is not a strict requirement). In some embodiments, this scaling occurs a defined amount of time after the initial presentation of the presented traceable image 114 at time indicator A 402, and may occur when no trace input has been received (e.g., no trace event of "touchstart", etc., has been received or detected) within the defined period of time.

Similarly, at another time indicator C 406, the display is instead modified according to the indication of modification value "0.5" and thus the original presented traceable image 114 is scaled to be a modified traceable image 410B that is one-half of the original size. Additionally, at time C 406 the modified traceable image 410B is also moved within the touch-enabled display 108 to the right. Accordingly, although not illustrated herein, this change in position may also be indicated within the indication of modification (e.g., as a magnitude and/or direction, or as a new coordinate value of the image such as a top-left corner of the image or a center of the image), which may be transmitted to the TCE 102 to assist in validation.

In some embodiments, the computing device 104 may receive the modification values (e.g., scaling values) from the TCE 102, which may be part of the client-side CAPTCHA code 112. In some embodiments, the client-side CAPTCHA code 112 may generate its own modification values randomly, which may be subject to guidelines indicating, e.g., that any generated modification values must be within a particular range of values.

In some embodiments, the client-side CAPTCHA code 112 may, upon detecting the one or more touch events making up the trace of the currently-displayed image, generate a set of relative coordinates of the trace (as described above) and may optionally "normalize" the coordinates back to be within the same scale and/or location of the original presented traceable image 114. For example, if a user 106 provides a trace of the one-half size modified traceable image 410B (at time C 406), the client-side CAPTCHA code 112 may generate a set of relative coordinates that are scaled by multiplying the relative coordinates it determines by 2.0 (to offset the previous scaling by the modification value of "0.5").

Additionally, in some embodiments the described modifications occur local to the computing device 104 such that no traffic is sent or received (e.g., between the computing device 104 and the TCE 102) in order to present modified traceable images to the user 106.

In some embodiments, each modification of the traceable image may instead be performed by the TCE 102. For example, the TCE 102 may periodically determine that a modification is to occur, generate a new or modified traceable image, and send the traceable image to be displayed. Alternatively, the client-side CAPTCHA code 112 may determine that a modification is to occur (e.g., via an expiration of a timer) and send a request to the TCE 102 for a modified or new traceable image.

Exemplary methods are now presented in accord with some embodiments of the invention from the perspective of various entities within an improved traceable image CAPTCHA system.

Figure 5:
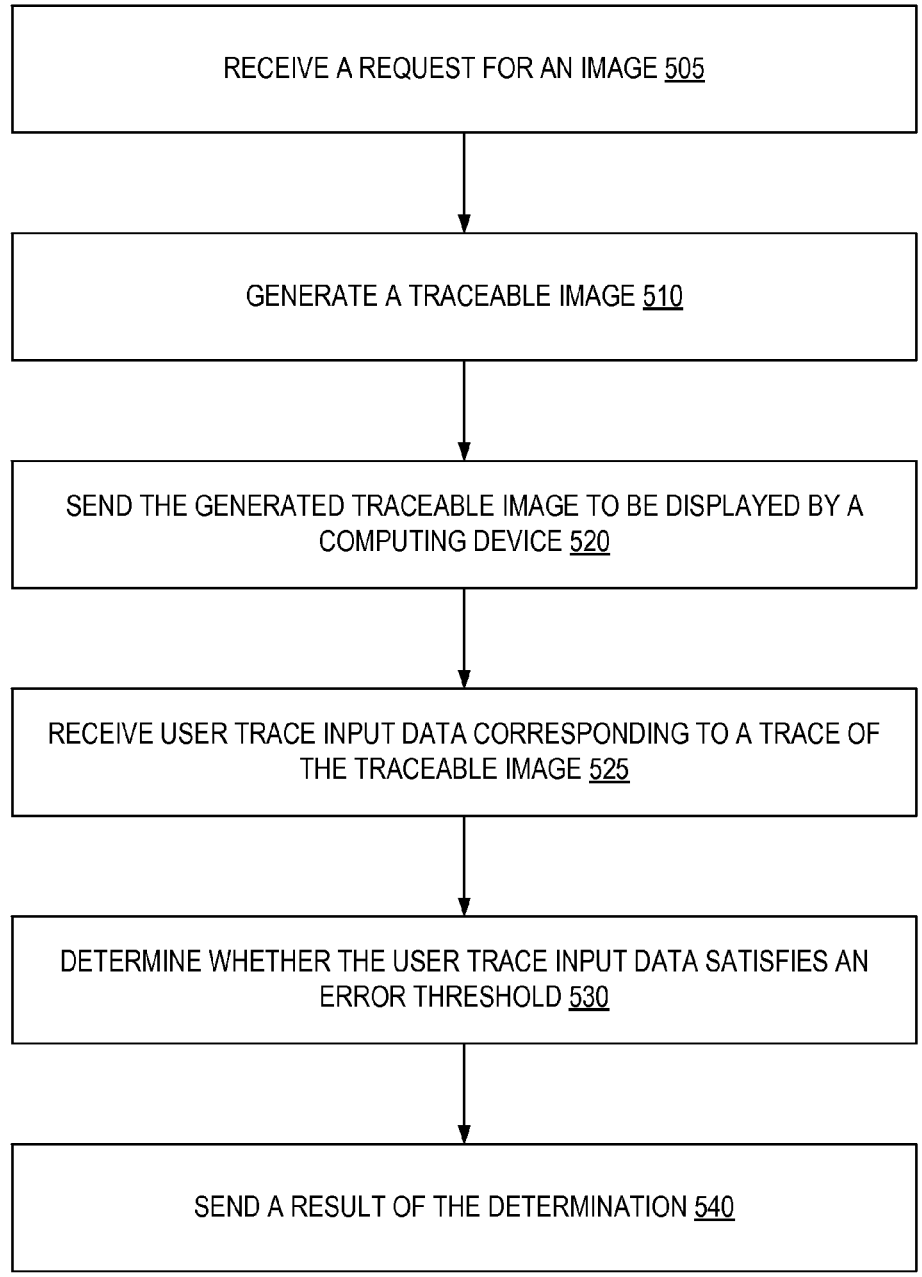
FIG. 5 illustrates a high-level flow 500 in a traceable CAPTCHA engine for utilizing an improved CAPTCHA technique employing traceable images according to some embodiments of the present invention.

FIG. 5 illustrates a high-level flow 500 in a traceable CAPTCHA engine for utilizing an improved CAPTCHA technique employing traceable images according to some embodiments of the present invention. This flow 500 may be performed by a TCE implemented at a single computing device, and may be performed at a same single computing device that also presents a traceable image to a user and receives the trace input from the user. However, the flow 500 may also be performed in a "client-server" type configuration by a TCE at a computing device that is separate from a computing device of the user that presents the traceable image to the user and receives a user trace input. Further exemplary flows regarding client-server configurations will be presented later herein with respect to FIG. 6 and FIG. 7.

The processing depicted in FIG. 5 may be implemented in software (e.g., code, instructions, program) executed by one or more processing units (e.g., processors cores), hardware, or combinations thereof. The software may be stored in memory (e.g., on a memory device, on a non-transitory computer-readable storage medium). The particular series of processing steps depicted in FIG. 5 is not intended to be limiting. In one embodiment, the processing depicted in FIG. 5 is performed by the computing device 104 depicted in FIGS. 1 and 2.

At block 505, the flow 500 includes receiving a request for an image 505. The request may be transmitted by another application executing at the same computing device, or transmitted by another application executing at a different computing device. The application transmitting the request may be an application that will present the image to a user (e.g., a web browser), or may be an application that will provide the image to the user's computing device (e.g., a web server).

At block 510, the flow 500 includes generating a traceable image. In some embodiments, block 510 includes selecting one image of a plurality of pre-generated candidate images to be the "generated" image. In some embodiments, block 510 may include selecting one or more image elements from a set of image elements. In some embodiments, the selected image elements may be combined to form the generated image.

At block 520, the flow 500 includes sending the generated traceable image. In some embodiments, block 520 includes transmitting the generated traceable image as one or more packets across a communications network, and in some embodiments block 520 includes sending the generated traceable image (or an identifier thereof) to another process/thread/application executing on a same computing device as the TCE.

At block 525, the flow 500 includes receiving user trace input data corresponding to a trace of the traceable image. In some embodiments, the user trace input data comprises "raw" trace data (e.g., trace user input) provided by an operating system, and in some embodiments the user trace input data comprises a set of coordinates. The set of coordinates may be relative coordinates or absolute coordinates. In some embodiments, the set of coordinates are relative coordinates that were generated by client-side CAPTCHA code based upon "raw" trace user input.

At block 530, the flow 500 includes determining whether the user trace input data satisfies an error threshold. In an embodiment where the user trace input data comprises a set of coordinates, block 530 includes comparing the set of coordinates with a set of reference coordinates of the generated traceable image. In some embodiments, a distance value is generated based upon the comparison, which may be based upon individual distances between corresponding coordinates of the received set of coordinates and the reference set of coordinates. In an embodiment, if the distance value is within a defined error threshold range, the trace is determined to be "valid" and thus more likely than not generated by a human user. In an embodiment, if the distance value is not within a defined error threshold range, the trace is determined to be "invalid" and thus not clearly generated by a human user.

At block 540, the flow 500 includes sending a result of the determination. In some embodiments, the result of the determination comprises a binary-type result indicating a yes/no (or true/false, 0/1, etc.) identifying whether the user trace input data satisfied the error threshold. In some embodiments, block 540 includes sending the result of the determination to another application executing on a same computing device as the TCE, and in some embodiments block 540 includes transmitting the result to another computing device.

Figure 6:
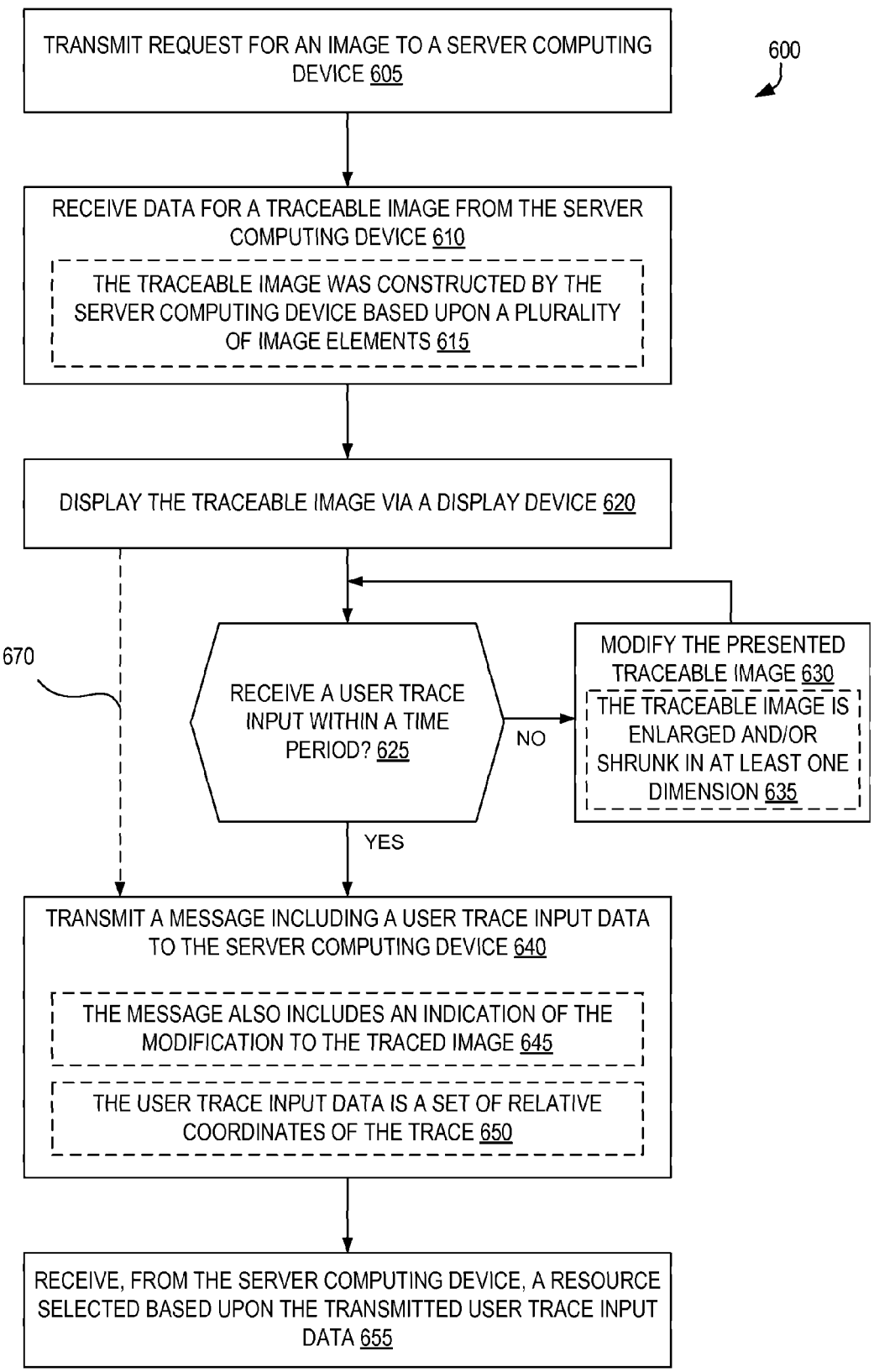
FIG. 6 illustrates a flow in a computing device for utilizing an improved CAPTCHA technique utilizing traceable images according to some embodiments of the present invention.

Having presented a high-level overview in FIG. 5, FIG. 6 now illustrates a flow 600 performed by a "client" in a client-server model. In some embodiments, the "client" is the computing device 104 depicted in FIG. 1 and FIG. 2, and in some embodiments, the "server" is the server computing device(s) of FIG. 2, which includes the TCE 102 and the web server 206. Thus, FIG. 6 illustrates a flow 600 in a computing device for utilizing an improved CAPTCHA technique utilizing traceable images according to some embodiments of the present invention. The processing depicted in FIG. 6 may be implemented in software (e.g., code, instructions, program) executed by one or more processing units (e.g., processors cores), hardware, or combinations thereof. The software may be stored on a non-transitory computer-readable storage medium, such as in memory or on a memory device. The particular series of processing steps depicted in FIG. 6 is illustrative and is not intended to be limiting.

Flow 600 includes, at block 605, transmitting a request for an image to a server computing device. The request may comprise an HTTP GET request message for an image that was defined in a webpage previously received by the computing device, or may comprise another type of request message. The request may be received by a web server at the server computer device.

At block 610, the flow 600 further includes receiving data for a traceable image from the server computing device. The data for the traceable image may be an image file, or may comprise a set of instructions for generating an image such as, but not limited to, a set of JavaScript instructions (e.g., instructions for drawing on an HTML5 <canvas> element). In some embodiments, at block 615 the traceable image was constructed by the server computing device based upon a plurality of image elements. The traceable image, in some embodiments, is constructed by the server computing device dynamically based upon its receipt of the request for the resource from block 605.

At block 620, the flow 600 includes displaying the traceable image to a user via a display device. In some embodiments, the display device comprises a touch-enabled (i.e., touch-sensitive) display device, though in other embodiments the display device is not touch-sensitive. In some embodiments, the displaying of the traceable image includes rendering or drawing the image within a web page presented by a browser via the display device, but in other embodiments the presenting occurs via a different software application that is not a traditional browser (though it may include browser-like functionality).

At block 625, the flow 600 includes determining whether a user input representing a trace of the traceable image was received within a time period. In some embodiments, this block 625 does not literally occur, but it instead is logically encompassed by the use of a timer (or "timeout" or "wakeup") that will trigger an event after some period of time if a user input has not occurred. In this case, when the timer is triggered, the flow 600 will continue with block 630. Additionally, if a user input is received before the timer is triggered, flow may continue with block 640. Moreover, in some embodiments that do not utilize dynamically-modifying traceable images, the flow 600 may proceed via path 670 down to block 640.

When a user input is not received in a defined time period, as represented by block 625, flow continues to block 630, where the presented traceable image is modified. In some embodiments, this includes block 635, where some or all of the traceable image is scaled (e.g., enlarged and/or shrunk) in at least one dimension, though in some embodiments the modification includes moving some or all of the presented image to a new location of the display, tilting/skewing some or all of the traceable image, mirroring the traceable image, pinching some or all of the traceable image, cropping some of the traceable image, color-modifying some or all of the traceable image, etc. Additionally, in some embodiments block 360 includes applying multiple image modifications, which may or may not include the scaling described by block 635. In any case, flow continues back to await a user trace input. (In some embodiments, flow will continue back at block 605, where another request for a new image is sent.)

The flow 600 continues with block 640, in which a message is transmitted to the server computing device including user trace input data. In some embodiments, the user trace input data includes "raw" data acquired via one or more trace input events, and in some embodiments, as depicted by block 645, the message may also include the indication of the modification (e.g., a modification value related to the size, location, position, etc. of the modified traceable image corresponding to the trace input).

In some embodiments, when a user trace input is received (e.g., as one or more touch events), the user trace input may be modified by converting it to a set of relative coordinates, which may be based upon the associated modification value corresponding to the state of the traceable image when the trace occurred. Thus, in some embodiments the user trace input data comprises a set of coordinates generated based upon the user trace, and the set of coordinates may, as represented by block 650, by a set of relative coordinates where one or more of the coordinates are relative to another of the set of coordinates.

At block 655, the flow 600 includes receiving, from the server computing device, a resource selected based upon the transmitted user trace input data. For example, the server computing device may, based upon determining whether the trace was acceptable (e.g., was within an error tolerance range of the state of the particular presented image that was traced), either require the user to solve another traceable image CAPTCHA (e.g., the resource may identify or comprise another traceable image), perform a different type of user authentication (e.g., prompt the user for different authentication data, including but not limited to a username, password, personal information such as a name or address or email address, answers to configured "challenge" questions, etc.), refuse to provide the user with other requested resources, or provide an earlier-requested resource (or an inherently-requested "home page" or "landing page") to the user.

For example, in some embodiments the received resource is a resource (e.g., a webpage or multimedia content) that was requested by the user when the trace is acceptable. In some embodiments, when the trace is not acceptable, the received resource may involve an additional CAPTCHA for the user to trace. Of course, in some embodiments this process may occur repeatedly if the user has not yet reached a configured number of allowable trace attempts (e.g., per a policy configuration), and if the user meets or exceeds that configured number, the returned resource may indicate that the maximum number of attempts (e.g., for a time period) has been met and/or that the user will not be returned the user-requested resource.

After receipt of the resource at block 655, the flow may further include displaying the resource to the user, which may occur via a touch-enabled (or non-touch-enabled) display of the computing device. As one example, the resource may include a web page, and the displaying of the web page may comprise retrieving resources identified within the web page and rendering the web page via a browser or other application.

Figure 7:
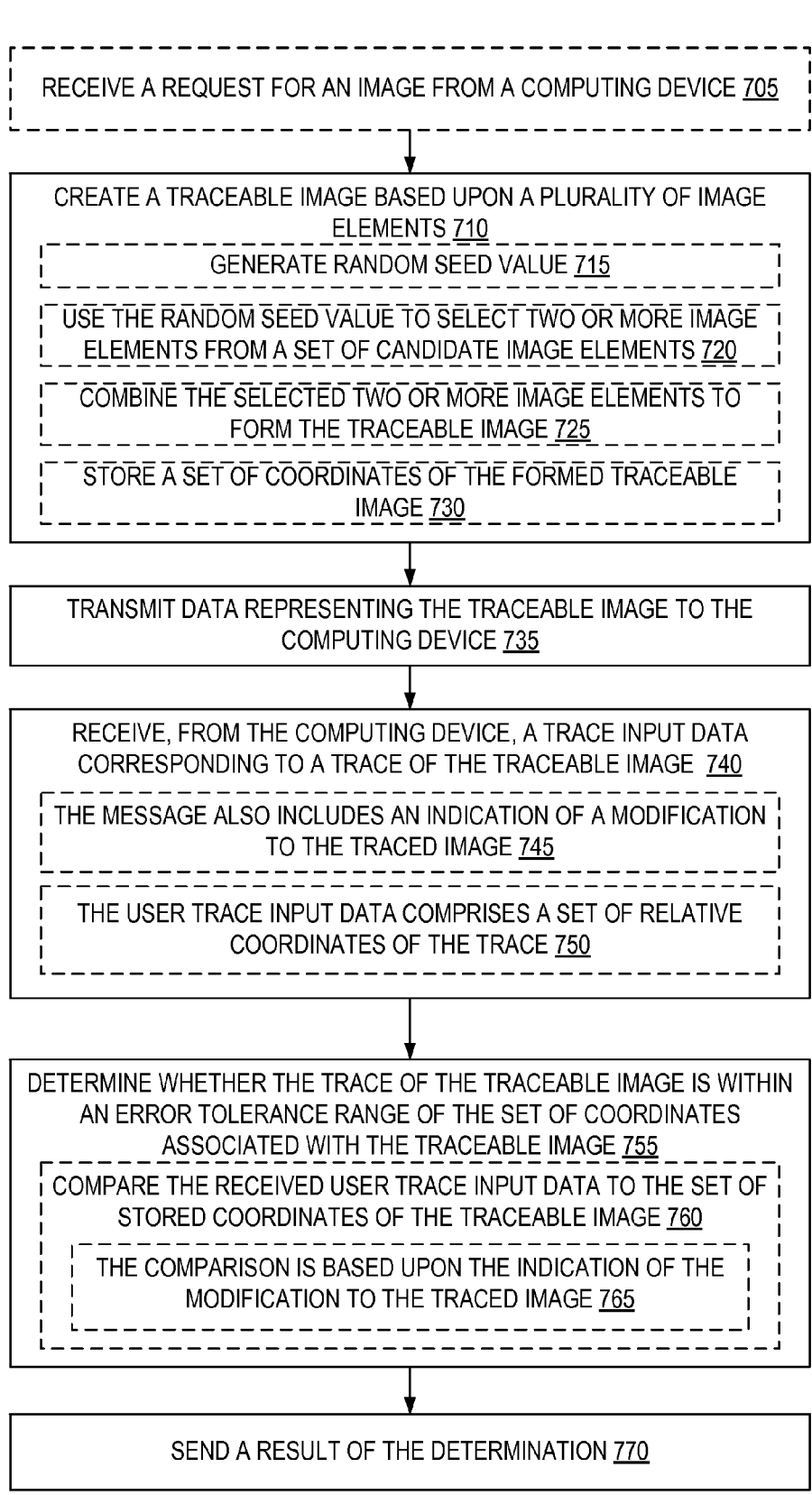
FIG. 7 illustrates a flow in one or more server computing devices for utilizing an improved CAPTCHA technique utilizing traceable images according to some embodiments of the present invention.

From another perspective, FIG. 7 illustrates a flow 700 in one or more server computing devices for utilizing an improved CAPTCHA technique utilizing traceable images according to some embodiments of the present invention. The processing depicted in FIG. 7 may be implemented in software (e.g., code, instructions, program) executed by one or more processing units (e.g., processors cores), hardware, or combinations thereof. The software may be stored on a non-transitory computer-readable storage medium, such as in memory or on a memory device. The particular series of processing steps depicted in FIG. 7 is not intended to be limiting. In one embodiment, the processing depicted in FIG. 7 is performed by one or more server computing devices 208 executing a TCE 102 and web server 206 as depicted in FIG. 2.

At block 705, the flow 700 includes receiving a request for a CAPTCHA from a computing device. The request may be a request for an image or for a script (e.g., JavaScript file) that provides functionality for and draws the traceable image (e.g., client-side CAPTCHA code 112). In some embodiments, the request is an HTTP GET request message transported over TCP/IP.

Optionally, at block 710 the flow 700 includes creating a traceable image based upon a plurality of image elements 710. This block 710 may occur responsive to block 705, and thus be thought of as a dynamic traceable image generation. In some embodiments, though, the traceable image may be generated based upon just one image element, and/or may be pre-generated in a "static" manner that is not responsive to a request message such as that described in block 705.

In some embodiments with block 710, the processing may include generating a random seed value (e.g., a number, value, or vector used to initialize a pseudorandom number generator) at block 715, which may be based upon a time value from a hardware or software clock, based on one or more values from the received request (from block 705), based upon an output of a hash function or cryptographic function, or other random or pseudo-random data. The random seed value may be generated, in whole or in part, by a cryptographically secure pseudorandom number generator or by a hardware random number generator.

Block 710 may also include, at block 720, using the random seed value to select two or more image elements from a set of image elements. Those of ordinary skill in the art will recognize a variety of ways to perform this task, including but not limited to using the random seed to generate one or more random numbers using well-known techniques, and selecting the two or more image elements from a set of image elements based upon these random numbers (e.g., using the random numbers to index the set of image elements, perhaps using a modulo operation with a random number to generate an output index value that "points" to one of the candidate image elements, which is similar to cache memory placement techniques utilized for directly mapped caches, for example).

In some embodiments, block 710 includes, at block 725, combining the selected two or more image elements to form a traceable image. This can include aligning the image elements such that the strokes depicted therein are in alignment at the edges of each image element, resulting in a combined image with a continuous stroke that can be traced. At optional block 730, the flow may include storing a set of coordinates of the formed traceable image in a memory (volatile or non-volatile), which describe/represent a depicted stroke or strokes in the image.

The flow 700 also includes, at block 735, transmitting data representing the traceable image to the computing device. This data may comprise an image file (e.g., JPG, PNG, GIF, etc.), or may comprise instructions or coordinates for drawing the image.

At block 740, a representation of a trace input corresponding to a trace of the traceable image made by the user is received from the computing device. This representation may comprise raw data from a trace event provided to an application executing at the computing device. This representation may comprise a set of coordinates, which may be relative coordinates as described by block 750. In some embodiments, the representation is sent within a message (e.g., as part of one or more packet payloads) that includes, per block 745, an indication of a modification made to the traced image that existed at the time of the trace. The indication of the modification may comprise one or more of, and/or combinations of, a Boolean value (e.g., a 0 or 1 indicating whether or not a particular modification was made), a numeric value (e.g., a scaling value of 3 indicating that the traced image was a magnified version of the original traceable image, a position value, etc.), or a text/alphanumeric value describing the modification.

At block 755, the flow 700 includes determining whether the trace of the traceable image (made by the user) is within an error tolerance range of the set of coordinates associated with the traceable image (e.g., stored at block 730). In some embodiments, this includes block 760, which compares the received user trace input data to the set of stored coordinates of the traceable image. In some embodiments, a distance value is generated to represent a distance, or difference, between the trace and the actual traceable image. In some embodiments, the distance value is based upon one or more point distance values indicating distances between corresponding points within the trace and the traceable image. In some embodiments, the distance value is a sum of all the point distance values. In some embodiments, the distance value is based upon a result of one or more integrations (or "integrals") being taken based upon representations of the trace and/or the generated image. In some embodiments, the distance value is compared to an acceptable error value, and if the distance value meets or exceeds the acceptable error value (or "allowable threshold distance value"), the trace is deemed invalid (i.e., not clearly a human user).

In some embodiments, the comparison of block 760 is based upon, per block 765, an indication of the modification to the traced image. For example, in an embodiment the received user trace input data is received with, at block 745, a modification value indicating a modification performed to the traced image. In some embodiments, block 765 includes modifying (e.g., scaling or otherwise adjusting, based upon the type(s) of modification) one or more value components (e.g., coordinates) of the user trace input data to normalize the trace data in order for a proper comparison with the stored set of coordinates (see block 730) of the traceable image.

At block 770, the flow 700 includes transmitting, to the computing device, a response message comprising a resource selected based upon a result of the determination of block 755. In some embodiments, block 770 includes transmitting a previously-sought resource (by the user) to the computing device when the trace is within the error tolerance range, but sending the computing device a different resource when the trace is not within the error tolerance range. This different resource may comprise, in some embodiments, another traceable image for another improved traceable image CAPTCHA, a query for a type of authentication data that is known to the user, and/or an error message.

Figure 8:
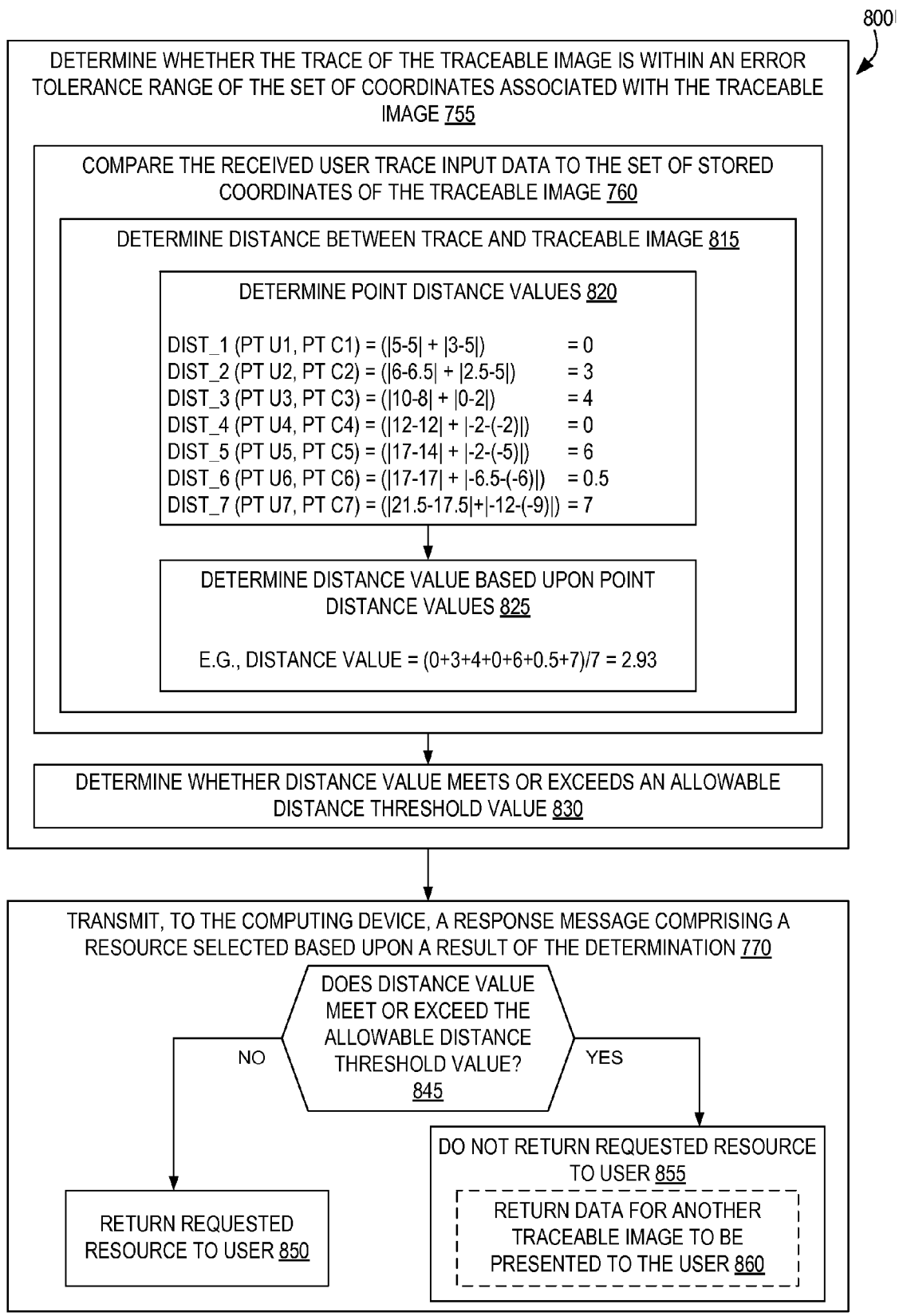
FIG. 8 illustrates an exemplary configuration of block 755 and block 770 of FIG. 7 according to some embodiments of the present invention.

For further explanation, FIG. 8 illustrates an exemplary configuration 800 of block 755 and block 770 of FIG. 7 according to some embodiments of the present invention. In this depicted embodiment, the "determining" block 755 includes block 760 in which the received user trace input data is compared to the set of stored coordinates of the traceable image. In this depiction, block 760 includes block 815, in which a distance is determined between the trace and the traceable image 815. As described earlier, this distance may be calculated in a variety of ways, but in this illustration it includes determining point distances at block 820, and then determining the distance value based upon these point distance values at block 825. The depicted embodiment, at block 820, determines distance values using a Manhattan measure (i.e., the distance between two coordinates (p1, p2), (q1, q2) in a plane is the sum of the absolute value of (p1–q1) and the absolute value of (p2–q2)), but of course other distance measures may similarly be used depending upon preference.

Then, at block 825 the overall distance value, in this particular depicted embodiment, is determined based upon the point values by calculating a simple mean of the point distance values, which is approximately 2.93. Of course, other overall distance values may similarly be used depending upon preference, including but not limited to calculating a sum of the point values, a median or mode of the point values, a standard deviation of the point values, or another mathematical or statistical representation of the point distance values.

Block 755, in this embodiment, also includes determining, at block 830 whether the overall distance value meets or exceeds an allowable distance threshold value. As an example, block 830 may include checking whether the distance value (e.g., 2.93) is greater than or equal to a defined distance threshold value (e.g., 2, 5, etc.).

At block 770, if the distance value does meet or exceed the allowable distance threshold value (at block 845), the user trace is not clearly resulting from a human, and thus a requested resource may not be returned to the user. Instead, in some embodiments, data will be returned for another traceable image to be presented to the user as another improved traceable image CAPTCHA. If, instead the distance value does not meet or exceed the allowable distance threshold value (at block 845), and thus the user trace is determined as very likely being made by a human user, block 770 may include returning, at block 850, a requested resource to the user.

Figure 9A:
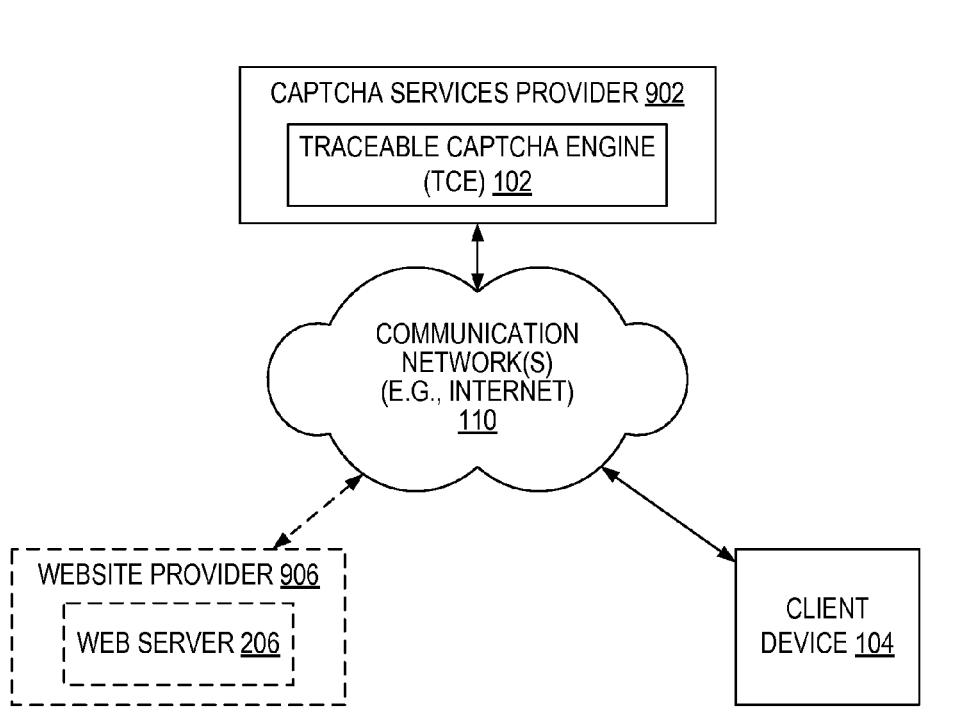
FIG. 9A illustrates an exemplary cloud-services configuration for implementing improved CAPTCHA techniques utilizing traceable images according to some embodiments of the present invention.
Figure 9B:
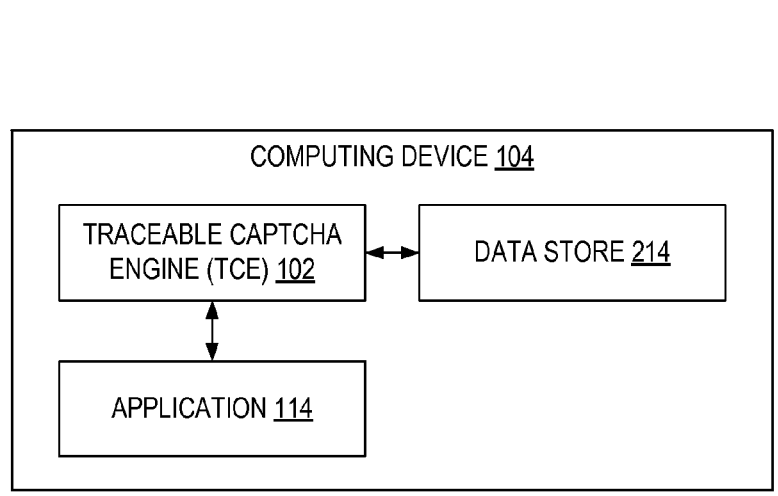
FIG. 9B illustrates an exemplary single device configuration for implementing improved CAPTCHA techniques utilizing traceable images according to some embodiments of the present invention.

Having presented some exemplary flows, FIG. 9A and FIG. 9B present two possible system configurations.

FIG. 9A illustrates an exemplary cloud-services system 900 configuration for implementing improved CAPTCHA techniques utilizing traceable images according to some embodiments of the present invention. System 900 includes one or more communication networks 110 connecting a client device 104, a CAPTCHA services provider 902, and optionally a separate website provider 906.

In this embodiment, the website provider 906 may implement a web server 206 that provides a website to the client device 104. The website may include one or more webpages including references to images (or other data, such as scripts, etc.) provided by the CAPTCHA services provider 902. Thus, in one configuration, a client device 104 receives one or more webpages from website provider 906 that cause the client device 104 to request a traceable image.

Thus, the client device 104 may directly request the traceable image (and related code/data) from the TCE 102 of CAPTCHA services provider 902, or the traceable image may be provided through the website provider 906 but actually generated by CAPTCHA services provider 902.

Accordingly, when a trace of the traceable image is made, the client device 104 may transmit the user trace input directly to the TCE 102 or to the website provider 906 that, in turn, may provide the user trace input back to the TCE 102 for validation.

Similarly, the result of the validation performed by the TCE 102 may be provided directly back to the client device 104 from the TCE 102, or may be provided back to the website provider 906 from the TCE 102, which may forward the result back to the client device 104, or select a resource to be provided the client device 104 based upon the result of the validation. For example, if the validation succeeds, the web server 206 may transmit a requested resource back to the client device 104, and if the validation succeeds, the web server 206 may transmit a different resource back to the client device 104. This different resource may cause the client device 104 to display another traceable image (for another CAPTCHA), perform a different type of authentication, etc.

Another system configuration is presented in FIG. 9B. FIG. 9B illustrates an exemplary single device configuration 950 for implementing improved CAPTCHA techniques utilizing traceable images according to some embodiments of the present invention. In this depicted embodiment, the TCE 102 executes on a same computing device as the application 114 utilizing the traceable images generated by the TCE 102. Thus, upon the application 114 seeking to validate that the user is a human, the application 114 transmits a request (e.g., via inter-process communication, making a function/library call, etc.) to the TCE 102, which may access its data store 214 to generate a traceable image. The TCE 102 may then return the traceable image back to the application, or may itself cause a user interface to be displayed with the traceable image. Thus, either the TCE 102 or the application 114 will receive user trace input, and the TCE 102 will determine whether the trace is valid, and a send a response back to the application 114 to indicate the result of this validation.

Figure 10:
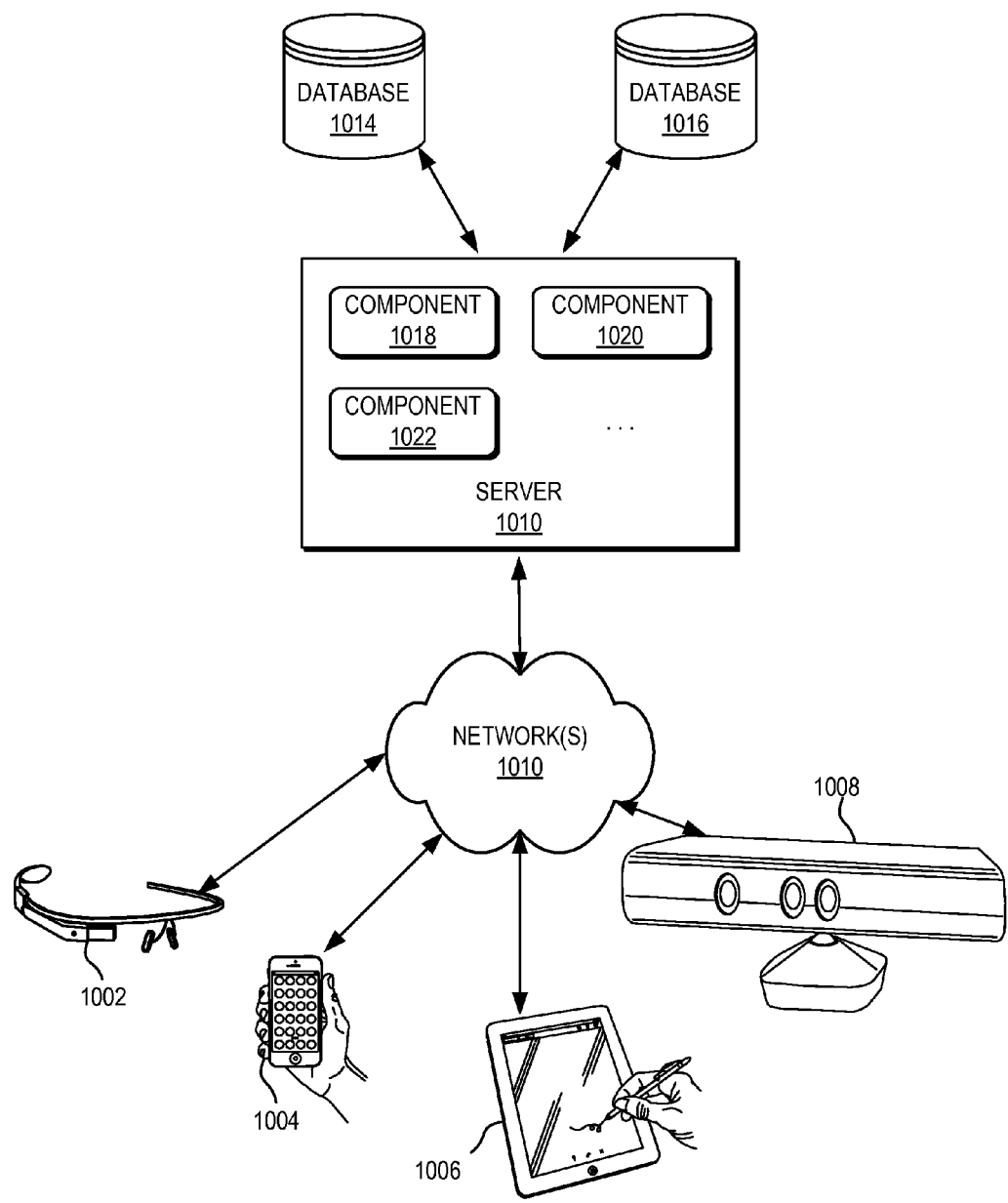
FIG. 10 depicts a simplified diagram of a distributed system for implementing an embodiment.

FIG. 10 depicts a simplified diagram of a distributed system 1000 for implementing an embodiment. In the illustrated embodiment, distributed system 1000 includes one or more client computing devices 1002, 1004, 1006, and 1008 (examples of computing device 104), which are configured to execute and operate a client application such as a web browser, proprietary client (e.g., Oracle Forms), or the like over one or more network(s) 1010. Server 1012 may be communicatively coupled with remote client computing devices 1002, 1004, 1006, and 1008 via network 1010.

In various embodiments, server 1012 may be adapted to run one or more services or software applications such as services and applications that provide the improved traceable image CAPTCHA processing. In certain embodiments, server 1012 may also provide other services or software applications that can include non-virtual and virtual environments. In some embodiments, these services may be offered as web-based or cloud services or under a Software as a Service (SaaS) model to the users of client computing devices 1002, 1004, 1006, and/or 1008. Users operating client computing devices 1002, 1004, 1006, and/or 1008 may in turn utilize one or more client applications to interact with server 1012 to utilize the services provided by these components.

In the configuration depicted in FIG. 10, software components 1018, 1020 and 1022 of system 1000 are shown as being implemented on server 1012. In other embodiments, one or more of the components of system 1000 and/or the services provided by these components may also be implemented by one or more of the client computing devices 1002, 1004, 1006, and/or 1008. Users operating the client computing devices may then utilize one or more client applications to use the services provided by these components. These components may be implemented in hardware, firmware, software, or combinations thereof. It should be appreciated that various different system configurations are possible, which may be different from distributed system 1000. The embodiment shown in FIG. 10 is thus one example of a distributed system for implementing an embodiment system and is not intended to be limiting.

Client computing devices 1002, 1004, 1006, and/or 1008 may include various types of computing systems. For example, client computing devices may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 1010.

Although distributed system 1000 in FIG. 10 is shown with four client computing devices, any number of client computing devices may be supported. Other devices, such as devices with sensors, etc., may interact with server 1012.

Network(s) 1010 in distributed system 1000 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 1010 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 1012 may be composed of one or more general purpose computers, specialized server computers (including, by way of example, PC (personal computer) servers, UNIXO servers, mid-range servers, mainframe computers, rack-mounted servers, etc.), server farms, server clusters, or any other appropriate arrangement and/or combination. Server 1012 can include one or more virtual machines running virtual operating systems, or other computing architectures involving virtualization. One or more flexible pools of logical storage devices can be virtualized to maintain virtual storage devices for the server. Virtual networks can be controlled by server 1012 using software defined networking. In various embodiments, server 1012 may be adapted to run one or more services or software applications described in the foregoing disclosure. For example, server 1012 may correspond to a server for performing processing as described above according to an embodiment of the present disclosure.

Server 1012 may run an operating system including any of those discussed above, as well as any commercially available server operating system. Server 1012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1012 may include one or more applications to analyze and consolidate data feeds and/or event updates received from users of client computing devices 1002, 1004, 1006, and 1008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1012 may also include one or more applications to display the data feeds and/or real-time events via one or more display devices of client computing devices 1002, 1004, 1006, and 1008.

Distributed system 1000 may also include one or more databases 1014 and 1016. These databases may provide a mechanism for storing information such as user interactions information, usage patterns information, adaptation rules information, and other information used by embodiments of the present invention. Databases 1014 and 1016 may reside in a variety of locations. By way of example, one or more of databases 1014 and 1016 may reside on a non-transitory storage medium local to (and/or resident in) server 1012. Alternatively, databases 1014 and 1016 may be remote from server 1012 and in communication with server 1012 via a network-based or dedicated connection. In one set of embodiments, databases 1014 and 1016 may reside in a storage-area network (SAN). Similarly, any necessary files for performing the functions attributed to server 1012 may be stored locally on server 1012 and/or remotely, as appropriate. In one set of embodiments, databases 1014 and 1016 may include relational databases, such as databases provided by Oracle, that are adapted to store, update, and retrieve data in response to SQL-formatted commands.

Figure 11:
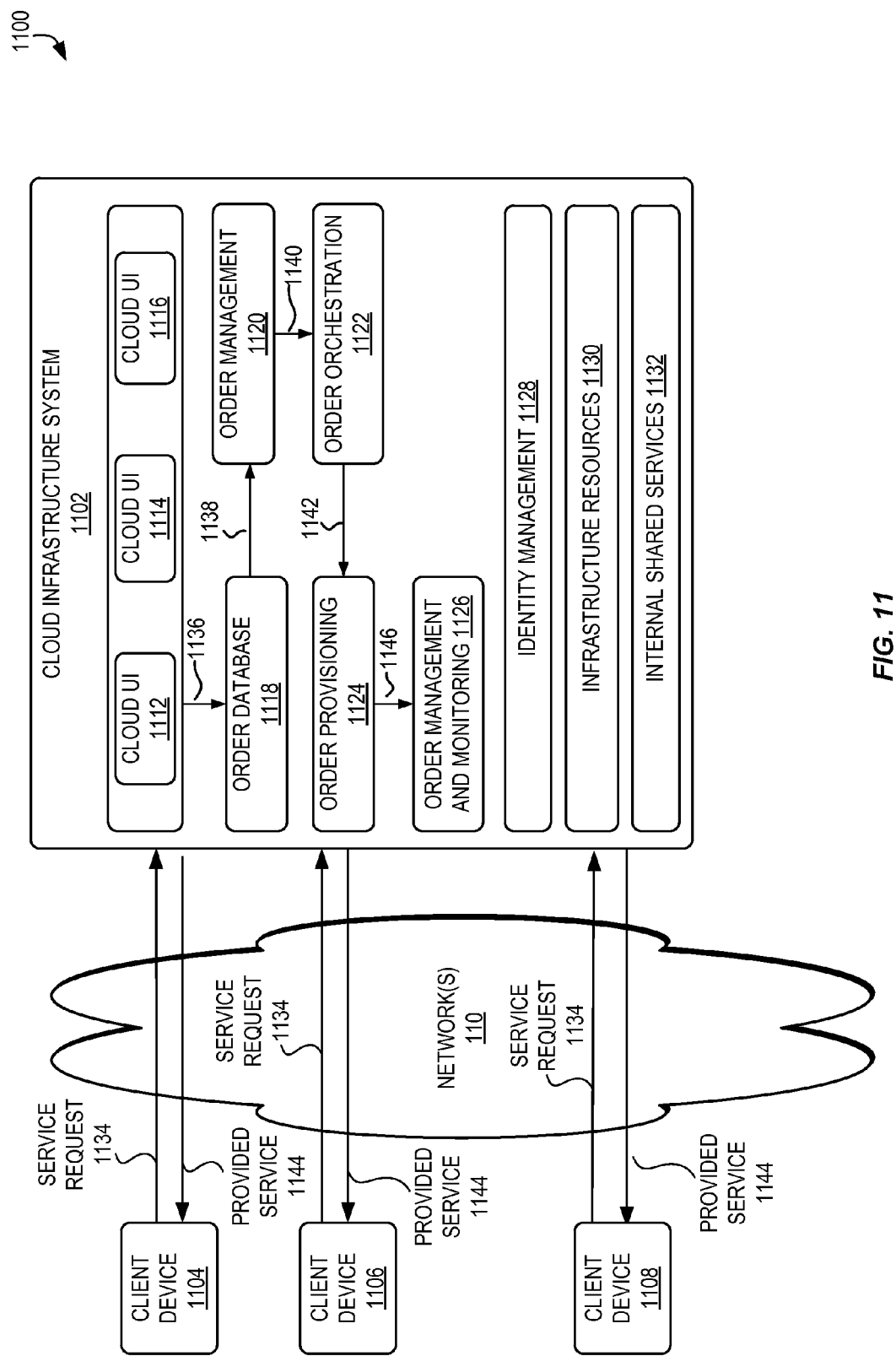
FIG. 11 is a simplified block diagram of one or more components of a system environment in which services may be offered as cloud services, in accordance with an embodiment of the present disclosure.

In some embodiments, the improved traceable image CAPTCHAs described above may be offered as services via a cloud environment. FIG. 11 is a simplified block diagram of one or more components of a system environment 1100 in which services may be offered as cloud services, in accordance with an embodiment of the present disclosure. In the illustrated embodiment in FIG. 11, system environment 1100 includes one or more client computing devices 1104, 1106, and 1108 that may be used by users to interact with a cloud infrastructure system 1102 that provides cloud services, including services for generating and/or validating improved traceable image CAPTCHAs. Cloud infrastructure system 1102 may comprise one or more computers and/or servers that may include those described above for server 1012.

It should be appreciated that cloud infrastructure system 1102 depicted in FIG. 11 may have other components than those depicted. Further, the embodiment shown in FIG. 11 is only one example of a cloud infrastructure system that may incorporate an embodiment of the invention. In some other embodiments, cloud infrastructure system 1102 may have more or fewer components than shown in the figure, may combine two or more components, or may have a different configuration or arrangement of components.

Client computing devices 1104, 1106, and 1108 may be devices similar to those described above for 1002, 1004, 1006, and 1008. Client computing devices 1104, 1106, and 1108 may be configured to operate a client application such as a web browser, a proprietary client application (e.g., Oracle Forms), or some other application, which may be used by a user of the client computing device to interact with cloud infrastructure system 1102 to use services provided by cloud infrastructure system 1102. Although exemplary system environment 1100 is shown with three client computing devices, any number of client computing devices may be supported. Other devices such as devices with sensors, etc. may interact with cloud infrastructure system 1102.

Network(s) 110 may facilitate communications and exchange of data between clients 1104, 1106, and 1108 and cloud infrastructure system 1102. Each network may be any type of network familiar to those skilled in the art that can support data communications using any of a variety of commercially-available protocols, including those described above for network(s) 1010.

In certain embodiments, services provided by cloud infrastructure system 1102 may include a host of services that are made available to users of the cloud infrastructure system on demand. In addition to services related to improved traceable image CAPTCHAs, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 1102 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1102 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 1102 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 1102 may be adapted to automatically provision, manage and track a customer's subscription to services offered by cloud infrastructure system 1102. Cloud infrastructure system 1102 may provide the cloud services via different deployment models. For example, services may be provided under a public cloud model in which cloud infrastructure system 1102 is owned by an organization selling cloud services (e.g., owned by Oracle Corporation) and the services are made available to the general public or different industry enterprises. As another example, services may be provided under a private cloud model in which cloud infrastructure system 1102 is operated solely for a single organization and may provide services for one or more entities within the organization. The cloud services may also be provided under a community cloud model in which cloud infrastructure system 1102 and the services provided by cloud infrastructure system 1102 are shared by several organizations in a related community. The cloud services may also be provided under a hybrid cloud model, which is a combination of two or more different models.

In some embodiments, the services provided by cloud infrastructure system 1102 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1102. Cloud infrastructure system 1102 then performs processing to provide the services in the customer's subscription order.

In some embodiments, the services provided by cloud infrastructure system 1102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 1102 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 1102 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1102 may also include infrastructure resources 1130 for providing the resources used to provide various services to customers of the cloud infrastructure system. In one embodiment, infrastructure resources 1130 may include pre-integrated and optimized combinations of hardware, such as servers, storage, and networking resources to execute the services provided by the PaaS platform and the SaaS platform, and other resources.

In some embodiments, resources in cloud infrastructure system 1102 may be shared by multiple users and dynamically re-allocated per demand. Additionally, resources may be allocated to users in different time zones. For example, cloud infrastructure system 1102 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1132 may be provided that are shared by different components or modules of cloud infrastructure system 1102 to enable provisioning of services by cloud infrastructure system 1102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1102 may provide comprehensive management of cloud services (e.g., SaaS, PaaS, and IaaS services) in the cloud infrastructure system. In one embodiment, cloud management functionality may include capabilities for provisioning, managing, and tracking a customer's subscription received by cloud infrastructure system 1102, and the like.

In one embodiment, as depicted in FIG. 11, cloud management functionality may be provided by one or more modules, such as an order management module 1120, an order orchestration module 1122, an order provisioning module 1124, an order management and monitoring module 1126, and an identity management module 1128. These modules may include or be provided using one or more computers and/or servers, which may be general purpose computers, specialized server computers, server farms, server clusters, or any other appropriate arrangement and/or combination.

In an exemplary operation, at 1134, a customer using a client device, such as client device 1104, 1106 or 1108, may interact with cloud infrastructure system 1102 by requesting one or more services provided by cloud infrastructure system 1102 and placing an order for a subscription for one or more services offered by cloud infrastructure system 1102. In certain embodiments, the customer may access a cloud User Interface (UI) such as cloud UI 1112, cloud UI 1114 and/or cloud UI 1116 and place a subscription order via these UIs. The order information received by cloud infrastructure system 1102 in response to the customer placing an order may include information identifying the customer and one or more services offered by the cloud infrastructure system 1102 that the customer intends to subscribe to.

At 1136, the order information received from the customer may be stored in an order database 1118. If this is a new order, a new record may be created for the order. In one embodiment, order database 1118 can be one of several databases operated by cloud infrastructure system 1118 and operated in conjunction with other system elements.

At 1138, the order information may be forwarded to an order management module 1120 that may be configured to perform billing and accounting functions related to the order, such as verifying the order, and upon verification, booking the order.

At 1140, information regarding the order may be communicated to an order orchestration module 1122 that is configured to orchestrate the provisioning of services and resources for the order placed by the customer. In some instances, order orchestration module 1122 may use the services of order provisioning module 1124 for the provisioning. In certain embodiments, order orchestration module 1122 enables the management of business processes associated with each order and applies business logic to determine whether an order should proceed to provisioning.

As shown in the embodiment depicted in FIG. 11, at 1142, upon receiving an order for a new subscription, order orchestration module 1122 sends a request to order provisioning module 1124 to allocate resources and configure resources needed to fulfill the subscription order. Order provisioning module 1124 enables the allocation of resources for the services ordered by the customer. Order provisioning module 1124 provides a level of abstraction between the cloud services provided by cloud infrastructure system 1100 and the physical implementation layer that is used to provision the resources for providing the requested services. This enables order orchestration module 1122 to be isolated from implementation details, such as whether or not services and resources are actually provisioned on the fly or pre-provisioned and only allocated/assigned upon request.

At 1144, once the services and resources are provisioned, a notification may be sent to the subscribing customers indicating that the requested service is now ready for use. In some instance, information (e.g. a link) may be sent to the customer that enables the customer to start using the requested services.

At 1146, a customer's subscription order may be managed and tracked by an order management and monitoring module 1126. In some instances, order management and monitoring module 1126 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 1100 may include an identity management module 1128 that is configured to provide identity services, such as access management and authorization services in cloud infrastructure system 1100. In some embodiments, identity management module 1128 may control information about customers who wish to utilize the services provided by cloud infrastructure system 1102. Such information can include information that authenticates the identities of such customers and information that describes which actions those customers are authorized to perform relative to various system resources (e.g., files, directories, applications, communication ports, memory segments, etc.) Identity management module 1128 may also include the management of descriptive information about each customer and about how and by whom that descriptive information can be accessed and modified.

Figure 12:
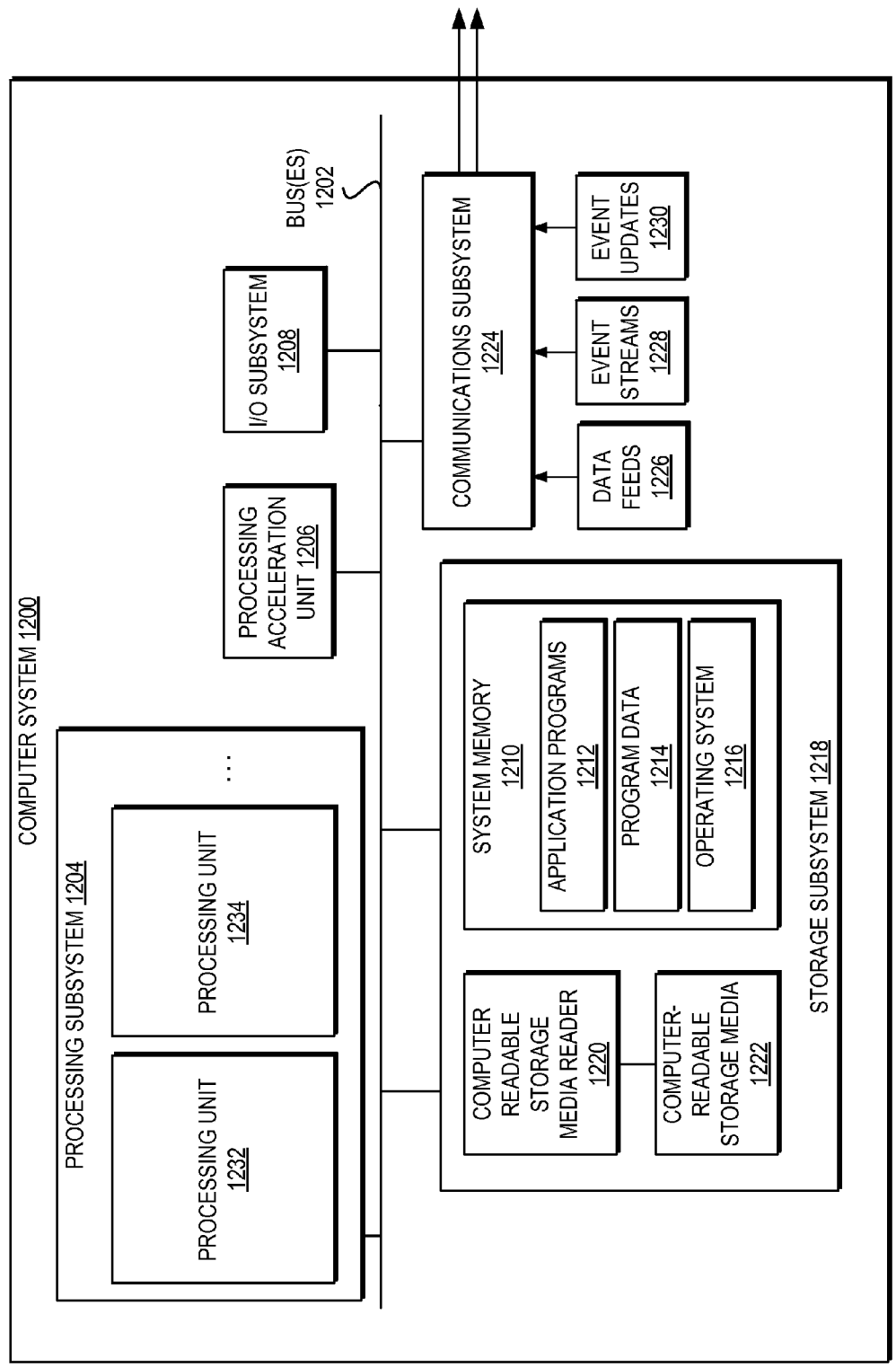
FIG. 12 illustrates an exemplary computer system that may be used to implement an embodiment of the present invention.

FIG. 12 illustrates an exemplary computer system 1200 that may be used to implement an embodiment of the present invention. In some embodiments, computer system 1200 may be used to implement any of the various servers and computer systems described above. As shown in FIG. 12, computer system 1200 includes various subsystems including a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 may include tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1204 controls the operation of computer system 1200 and may comprise one or more processing units 1232, 1234, etc. A processing unit may include be one or more processors, including single core or multicore processors, one or more cores of processors, or combinations thereof. In some embodiments, processing subsystem 1204 can include one or more special purpose co-processors such as graphics processors (GPUs), digital signal processors (DSPs), or the like. In some embodiments, some or all of the processing units of processing subsystem 1204 can be implemented using customized circuits, such as application specific integrated circuits (ASICs), or field programmable gate arrays (FPGAs).

In some embodiments, the processing units in processing subsystem 1204 can execute instructions stored in system memory 1210 or on computer readable storage media 1222. In various embodiments, the processing units can execute a variety of programs or code instructions and can maintain multiple concurrently executing programs or processes. At any given time, some or all of the program code to be executed can be resident in system memory 1210 and/or on computer-readable storage media 1222 including potentially on one or more storage devices. Through suitable programming, processing subsystem 1204 can provide various functionalities described above for generating and/or validating improved traceable image CAPTCHAs.

In certain embodiments, a processing acceleration unit 1206 may be provided for performing customized processing or for off-loading some of the processing performed by processing subsystem 1204 so as to accelerate the overall processing performed by computer system 1200.

I/O subsystem 1208 may include devices and mechanisms for inputting information to computer system 1200 and/or for outputting information from or via computer system 1200. In general, use of the term "input device" is intended to include all possible types of devices and mechanisms for inputting information to computer system 1200. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Ski® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1218 provides a repository or data store for storing information that is used by computer system 1200. Storage subsystem 1218 provides a tangible non-transitory computer-readable storage medium for storing the basic programming and data constructs that provide the functionality of some embodiments. Software (programs, code modules, instructions) that when executed by processing subsystem 1204 provide the functionality described above may be stored in storage subsystem 1218. The software may be executed by one or more processing units of processing subsystem 1204. Storage subsystem 1218 may also provide a repository for storing data used in accordance with the present invention.

Storage subsystem 1218 may include one or more non-transitory memory devices, including volatile and non-volatile memory devices. As shown in FIG. 12, storage subsystem 1218 includes a system memory 1210 and a computer-readable storage media 1222. System memory 1210 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1200, such as during start-up, may typically be stored in the ROM. The RAM typically contains data and/or program modules that are presently being operated and executed by processing subsystem 1204. In some implementations, system memory 1210 may include multiple different types of memory, such as static random access memory (SRAM) or dynamic random access memory (DRAM).

By way of example, and not limitation, as depicted in FIG. 12, system memory 1210 may store application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 12 OS, and Palm® OS operating systems.

Computer-readable storage media 1222 may store programming and data constructs that provide the functionality of some embodiments. Software (programs, code modules, instructions) that when executed by processing subsystem 1204 a processor provide the functionality described above may be stored in storage subsystem 1218. By way of example, computer-readable storage media 1222 may include non-volatile memory such as a hard disk drive, a magnetic disk drive, an optical disk drive such as a CD ROM, DVD, a Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1222 may provide storage of computer-readable instructions, data structures, program modules, and other data for computer system 1200.

In certain embodiments, storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for storing computer-readable information.

In certain embodiments, computer system 1200 may provide support for executing one or more virtual machines. Computer system 1200 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1200. Accordingly, multiple operating systems may potentially be run concurrently by computer system 1200. Each virtual machine generally runs independently of the other virtual machines.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to establish a communication channel to one or more client devices via the Internet for receiving and sending information from and to the client devices.

Communication subsystem 1224 may support both wired and/or wireless communication protocols. For example, in certain embodiments, communications subsystem 1224 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

Communication subsystem 1224 can receive and transmit data in various forms. For example, in some embodiments, communications subsystem 1224 may receive input communication in the form of structured and/or unstructured data feeds 1226, event streams 1228, event updates 1230, and the like. For example, communications subsystem 1224 may be configured to receive (or send) data feeds 1226 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1224 may be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1200 depicted in FIG. 12 is intended only as a specific example. Many other configurations having more or fewer components than the system depicted in FIG. 12 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter-process communication (IPC), and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method comprising:
    creating, by a first computing device, a traceable image by combining a plurality of image elements that each include trace data, wherein the traceable image is associated with a set of coordinates;
    sending, by the first computing device, data representing the traceable image to be displayed by a second computing device via a touch-enabled display;
    receiving, at the first computing device, a trace input data corresponding to a trace of the displayed traceable image made at the second computing device;
    determining, by the first computing device based upon the trace input data, whether the trace of the displayed traceable image is within an error tolerance range of the set of coordinates associated with the traceable image; and
    sending, by the first computing device, a result of the determination.

2. The method of claim 1, further comprising:
    selecting, based upon the result of the determination, a resource of a plurality of candidate resources to be transmitted to the second computing device; and
    transmitting the selected resource to the second computing device.

3. The method of claim 1, wherein said creating the traceable image further comprises:
    selecting the plurality of image elements from a set of image elements, wherein the selected plurality of image elements are combined to form the traceable image.

4. The method of claim 3, wherein each of said plurality of image elements comprises a representation of a line or a curve.

5. The method of claim 1, further comprising:
    transmitting, by the first computing device, a set of code instructions associated with the traceable image, wherein the set of code instructions, when executed by the second computing device, cause the second computing device to,
    responsive to a determination that the trace of the traceable image has not occurred within a period of time after the traceable image was displayed, modify, by the second computing device, the displayed traceable image.

6. The method of claim 5, wherein said modifying comprises changing a size of the displayed traceable image.

7. The method of claim 5, wherein said modifying does not require the second computing device to transmit or receive any data using any network interface of the second computing device.

8. The method of claim 1, further comprising:
    transmitting, by the first computing device, a set of code instructions associated with the traceable image, wherein the set of code instructions, when executed by the second computing device, cause the second computing device to,
    repeatedly modify, by the second computing device, the displayed traceable image at regular or changing time intervals until a timeout occurs or until the trace is made.

9. The method of claim 1, wherein the trace is made by a user physically interacting with the touch-enabled display.

10. The method of claim 1, wherein the trace data represents a set of points, wherein creating the traceable image further comprises identifying an end point of an image element, and wherein the image elements are combined by connecting the end point of the image element with another end point of another image element.

11. The method of claim 1, wherein the trace data of each of the plurality of image elements represents one or more strokes, and wherein the created traceable image is a combined image with a continuous stroke.

12. A method comprising:
    creating, by a first computing device, a traceable image by combining a plurality of image elements that each include trace data, wherein the traceable image is associated with a set of coordinates;
    sending, by the first computing device, data representing the traceable image to be displayed by a second computing device and a set of code instructions associated with the traceable image, wherein the set of code instructions, when executed by the second computing device, cause the second computing device to perform operations comprising:
    determining that the second computing device has failed to receive a trace input representing a trace of the displayed traceable image within a period of time after the traceable image was displayed, and
    modifying the displayed traceable image;
    receiving, at the first computing device, a trace input data corresponding to a trace of the displayed traceable image made at the second computing device after the displayed traceable image was modified;
    determining, by the first computing device based upon the trace input data, whether the trace of the displayed traceable image is within an error tolerance range of the set of coordinates associated with the traceable image; and
    sending, by the first computing device, a result of the determination.

13. The method of claim 12, wherein said modifying the displayed traceable image comprises modifying a size of the displayed traceable image.

14. The method of claim 12, wherein:
    the trace input data comprises a set of relative coordinates of the trace; and
    the determining whether the trace is within the error range comprises comparing the set of relative coordinates with the set of coordinates associated with the traceable image.

15. The method of claim 12, wherein said creating the traceable image comprises:
    selecting the plurality of image elements from a set of image elements, wherein the selected plurality of image elements are combined to form the traceable image.

16. The method of claim 12, wherein:
    the displayed traceable image is displayed on a non-touch-enabled display of the second computing device; and
    the trace is made by a user utilizing a user input device that is separate from the non-touch-enabled display.

17. A method comprising:
    creating, by a first computing device, a traceable image based on a plurality of image elements that each have a traceable portion, wherein the traceable image is associated with a set of coordinates;
    sending, by the first computing device, data representing the traceable image to be displayed by a second computing device via a touch-enabled display and a set of code instructions associated with the traceable image, wherein the set of code instructions, when executed by the second computing device, cause the second computing device to perform operations comprising:
    determining that the second computing device has failed to receive a trace input representing a trace of the displayed traceable image within a period of time after the traceable image was displayed, and
    modifying the displayed traceable image;
    receiving, at the first computing device, a trace input data corresponding to a trace of the displayed traceable image made at the second computing device after the displayed traceable image was modified;
    determining, by the first computing device based upon the trace input data, whether the trace of the displayed traceable image is within an error tolerance range of the set of coordinates associated with the traceable image; and
    sending, by the first computing device, a result of the determination.

18. The method of claim 17, wherein the creating the traceable image occurs responsive to a receipt of a request for the traceable image.

19. The method of claim 17, wherein said creating the traceable image comprises:
    selecting the plurality of image elements from a set of image elements, wherein the selected plurality of image elements are combined to form the traceable image.

20. The method of claim 19, wherein:
    the set of image elements has more image elements than the plurality of image elements; and
    the plurality of image elements are randomly selected from the set of image elements.

21. The method of claim 19, wherein the combining the plurality of image elements includes orienting a first image element of the plurality of image elements and a second image element of the plurality of image elements so that a first edge point of the first image element is adjacent to a second edge point of the second image element.

* * * * *